(12) United States Patent
Ro et al.

(10) Patent No.: US 8,291,269 B1
(45) Date of Patent: Oct. 16, 2012

(54) MULTI-WRITER IN-MEMORY NON-COPYING DATABASE (MIND) SYSTEM AND METHOD

(75) Inventors: Kwang T. Ro, Pleasanton, CA (US); Brian L. Andersen, San Rafael, CA (US); Stephen K. McGrogan, Pleasanton, CA (US)

(73) Assignee: Advent Software, Inc., San Francisco, CA (US)

( * ) Notice: Subject to any disclaimer, the term of this patent is extended or adjusted under 35 U.S.C. 154(b) by 75 days.

(21) Appl. No.: 13/295,697

(22) Filed: Nov. 14, 2011

Related U.S. Application Data

(63) Continuation of application No. 13/237,240, filed on Sep. 20, 2011.

(51) Int. Cl.
*G06F 11/00* (2006.01)
(52) U.S. Cl. .......................................... 714/49; 707/823
(58) Field of Classification Search ...................... 714/49
See application file for complete search history.

(56) References Cited

U.S. PATENT DOCUMENTS

| | | | |
|---|---|---|---|
| 4,805,134 A | 2/1989 | Calo et al. |
| 4,853,842 A | 8/1989 | Thatte et al. |
| 4,972,367 A | 11/1990 | Burke |
| 5,008,786 A | 4/1991 | Thatte |
| 5,010,478 A | 4/1991 | Deran |
| 5,043,885 A | 8/1991 | Robinson |
| 5,136,707 A | 8/1992 | Block et al. |
| 5,202,985 A | 4/1993 | Goyal |
| 5,237,661 A | 8/1993 | Kawamura et al. |
| 5,276,835 A | 1/1994 | Mohan et al. |
| 5,283,884 A | 2/1994 | Menon et al. |
| 5,283,894 A | 2/1994 | Deran |
| 5,305,389 A | 4/1994 | Palmer |
| 5,398,336 A | 3/1995 | Tantry et al. |
| 5,404,477 A | 4/1995 | Jippo |
| 5,408,653 A | 4/1995 | Josten et al. |
| 5,412,805 A | 5/1995 | Jordan, II et al. |
| 5,426,747 A | 6/1995 | Weinreb et al. |
| 5,428,761 A | 6/1995 | Herliy et al. |
| 5,434,992 A | 7/1995 | Mattson |
| 5,437,027 A | 7/1995 | Bannon et al. |
| 5,455,942 A | 10/1995 | Mohan et al. |
| 5,465,352 A | 11/1995 | Nakazaw et al. |
| 5,485,609 A | 1/1996 | Vitter et al. |
| 5,493,668 A | 2/1996 | Elko et al. |
| 5,499,367 A | 3/1996 | Bamford et al. |

(Continued)

OTHER PUBLICATIONS

Kinsley, K.C. and Hughes, C.E., Analysis of a Virtual Memory Model for Maintaining Database Views, IEEE Transactions on Software Engineering, May 1992, pp. 402-409, vol. 18, Issue 5 (abstract only).

(Continued)

*Primary Examiner* — Kamini Patel
(74) *Attorney, Agent, or Firm* — Stephen C. Glazier; K&L Gates LLP

(57) ABSTRACT

Embodiments of the invention relate to memory management methods and systems for object-oriented databases (OODB). In an embodiment, a database includes a plurality of memory-mapped file segments stored on at least one nonvolatile memory medium and not in main memory. An application program connects to the database with a plurality of writing processes to simultaneously write to an in-memory database, each writing process updating its own disk-based logfile, such that the effective disk writing speed is substantially increased and lock conflicts reduced.

30 Claims, 14 Drawing Sheets

U.S. PATENT DOCUMENTS

| | | | |
|---|---|---|---|
| 5,504,862 A * | 4/1996 | Suzuki et al. | 714/33 |
| 5,506,984 A | 4/1996 | Miller | |
| 5,550,971 A | 8/1996 | Brunner et al. | |
| 5,560,006 A | 9/1996 | Layden et al. | |
| 5,561,795 A | 10/1996 | Sarkar | |
| 5,574,902 A | 11/1996 | Josten et al. | |
| 5,608,904 A | 3/1997 | Chaudhuri et al. | |
| 5,611,076 A | 3/1997 | Durflinger et al. | |
| 5,615,360 A | 3/1997 | Bezek et al. | |
| 5,636,350 A | 6/1997 | Eick et al. | |
| 5,649,139 A | 7/1997 | Weinreb et al. | |
| 5,668,987 A | 9/1997 | Schneider | |
| 5,680,573 A | 10/1997 | Rubin et al. | |
| 5,682,527 A | 10/1997 | Cooper et al. | |
| 5,701,461 A | 12/1997 | Dalal et al. | |
| 5,706,506 A | 1/1998 | Jensen et al. | |
| 5,727,203 A | 3/1998 | Hapner et al. | |
| 5,745,904 A | 4/1998 | King et al. | |
| 5,758,149 A | 5/1998 | Bierma et al. | |
| 5,787,471 A | 7/1998 | Inoue et al. | |
| 5,805,809 A | 9/1998 | Singh et al. | |
| 5,812,996 A | 9/1998 | Rubin et al. | |
| 5,822,749 A | 10/1998 | Agarwal | |
| 5,826,253 A | 10/1998 | Bredenberg | |
| 5,832,521 A | 11/1998 | Klots et al. | |
| 5,835,908 A | 11/1998 | Bennett et al. | |
| 5,835,959 A | 11/1998 | McCool et al. | |
| 5,864,849 A | 1/1999 | Bohannon et al. | |
| 5,897,634 A | 4/1999 | Attaluri et al. | |
| 5,915,249 A | 6/1999 | Spencer | |
| 5,933,593 A | 8/1999 | Arun et al. | |
| 5,963,937 A | 10/1999 | Yamasaki et al. | |
| 6,009,271 A | 12/1999 | Whatley | |
| 6,014,673 A | 1/2000 | Davis et al. | |
| 6,070,165 A | 5/2000 | Whitmore | |
| 6,081,875 A | 6/2000 | Clifton et al. | |
| 6,122,627 A * | 9/2000 | Carey et al. | 707/694 |
| 6,173,292 B1 | 1/2001 | Barber et al. | |
| 6,314,417 B1 | 11/2001 | Bennett et al. | |
| 6,321,235 B1 | 11/2001 | Bird | |
| 6,330,565 B1 | 12/2001 | Nesbitt | |
| 6,353,833 B1 | 3/2002 | Bird et al. | |
| 6,446,062 B1 | 9/2002 | Levine et al. | |
| 6,457,021 B1 * | 9/2002 | Berkowitz et al. | 1/1 |
| 6,496,831 B1 * | 12/2002 | Baulier et al. | 1/1 |
| 6,507,847 B1 | 1/2003 | Fleischman | |
| 6,564,215 B1 * | 5/2003 | Hsiao et al. | 1/1 |
| 6,574,639 B2 | 6/2003 | Carey et al. | |
| 6,591,266 B1 | 7/2003 | Li et al. | |
| 6,598,119 B2 | 7/2003 | Becker et al. | |
| 6,609,126 B1 | 8/2003 | Smith et al. | |
| 6,865,658 B2 * | 3/2005 | Tomori et al. | 711/173 |
| 6,874,001 B2 * | 3/2005 | Narang et al. | 1/1 |
| 6,947,956 B2 | 9/2005 | Olstad et al. | |
| 6,957,237 B1 * | 10/2005 | Traversat et al. | 1/1 |
| 6,970,872 B1 * | 11/2005 | Chandrasekaran et al. | 1/1 |
| 7,013,469 B2 * | 3/2006 | Smith et al. | 719/328 |
| 7,017,162 B2 * | 3/2006 | Smith et al. | 719/328 |
| 7,047,401 B2 * | 5/2006 | Seal et al. | 712/244 |
| 7,062,480 B2 | 6/2006 | Fay et al. | |
| 7,107,260 B2 * | 9/2006 | Nakamura et al. | 707/741 |
| 7,222,117 B1 * | 5/2007 | McGrogan | 1/1 |
| 7,634,520 B1 | 12/2009 | Seiler et al. | |
| 2003/0120638 A1 | 6/2003 | Park et al. | |
| 2003/0204504 A1 | 10/2003 | Stuy et al. | |
| 2003/0221068 A1 | 11/2003 | Tsuji et al. | |
| 2003/0225662 A1 | 12/2003 | Horan et al. | |

OTHER PUBLICATIONS

Birrell, A., Jones, M. and Wobber, E., A Simple and Efficient Implementation of a Small Database, ACM Symposium on Operating Systems Principles archive, 1987, pp. 149-154 (abstract only).

Traiger, Irving L., Virtual Memory Management for Database Systems, ACM SIGOPS Operating Systems Review archive, 1982, pp. 26-48, vol. 16, Issue 4, ACM Press, New York, NY (abstract only).

Ji, Minwen, Affinity-based Management of Main Memory Database Clusters, ACM Transactions on Internet Technology (TOIT) archive, 2002, pp. 307-339, vol. 2, Issue 4 (abstract only).

Dionn, IronEye Cache—Default branch, Freshmeat.net, May 30, 2003 12:08 PST (abstract only).

Hoverd, Tim, Livestore—Default branch, Freshmeat.net, Oct. 23, 2002 10:22 PST (abstract only).

No author listed, twz1jdbcForMysql—Default branch, Freshmeat.net, Aug. 1, 1998 22:04 PST (abstract only).

Darling, Aaron, mpiBLAST—Default branch, Freshmeat.net, Feb. 11, 2003 19:55 PST (abstract only).

U.S. Appl. No. 11/331,389, filed Jan. 12, 2006.

U.S. Appl. No. 12/546,205, filed Aug. 24, 2009.

U S. Appl. No. 13/237,240, filed Sep. 20, 2011.

* cited by examiner

MULTI-WRITER IN-MEMORY NON-COPYING DATABASE (MIND) SYSTEM AND METHOD

CROSS-REFERENCE TO RELATED APPLICATION/PRIORITY CLAIM

The present patent application is a continuation of and claims the priority of co-pending U.S. patent application Ser. No. 13/237,240, filed on Sep. 20, 2011, under 35 U.S.C. §120, and which is hereby incorporated by reference into the present application.

BACKGROUND

1. Field

Embodiments of the present invention relate generally to object-oriented databases (OODBs). More specifically, embodiments relate to memory management methods and systems in such databases.

2. Description of Related Art

In the information age, databases are a precious commodity, storing immense quantities of data for use in various applications. Latency, or time needed to access stored database data, is a crucial metric for many performance-intensive applications. Portfolio management applications, for example, are generally performance-intensive.

In-memory databases are the fastest possible databases. In such databases, which place the dataset in main memory, any piece of information is available with almost zero latency. The memory requirements of such databases increase with the size of the stored dataset. Therefore, such databases become excessively expensive from a hardware perspective when datasets are very large. In addition, computer manufacturers limit the amount of memory that can be installed in their machines, which limits the maximum size of the dataset that can be stored.

Some database systems address this memory problem by using software to cache portions of the dataset in main memory while keeping the majority in secondary memory (i.e., secondary storage), such as on disk. While this approach solves one problem, it creates another: Complex software must keep track of the location of the objects being stored, moving copies of the in-memory objects back and forth from the disk. This approach also increases complexity and latency, as software must determine where to look for the object, i.e., in memory or on disk. In addition, desired data must be copied to the application's memory space because, for data integrity and functional reasons, users cannot be allowed direct access to the database copy of the object, whether it is found in the memory cache or on the disk.

Improvements to address these issues were developed and described in U.S. Pat. No. 7,222,117, for "Segmented Global Area Database," issued May 22, 2007, by McGrogan, which is incorporated herein in its entirety by this reference. An embodiment of that invention is sometimes referred to herein as "SAGA."

A need exists to scale up SAGA for larger data volumes.

BRIEF DESCRIPTION OF THE DRAWINGS

Embodiments of the present invention are described herein, by way of example, in conjunction with the following figures. FIGS. 1-8 refer to embodiments of the prior SAGA invention.

FIG. 1 shows a hardware and software schema according to an embodiment of the prior SAGA invention.

FIG. 2 shows a system according to an embodiment of the prior SAGA invention.

FIG. 3 shows a database structure according to an embodiment of the prior SAGA invention.

FIG. 4 shows a segmented data repository according to an embodiment of the prior SAGA invention.

FIG. 5 shows a representation of memory-mapped segment files according to an embodiment of the prior SAGA invention.

FIG. 6 shows a process according to an embodiment of the prior SAGA invention.

FIG. 8 shows a process according to an embodiment of the prior SAGA invention.

FIG. 9 depicts an exemplary procedure for a transaction locking process.

FIG. 10 depicts an exemplary procedure for obtaining a lock with sleep and penalty process techniques.

FIG. 11 depicts an exemplary representation of SAGA with a single permitted writing process.

FIG. 12 depicts an exemplary representation of SAGA using multiple simultaneous writing processes.

FIG. 13 depicts an exemplary representation of using multiple locks.

FIG. 14 depicts an exemplary transaction sequence.

EMBODIMENTS OF THE PRESENT INVENTION

Figure 1:
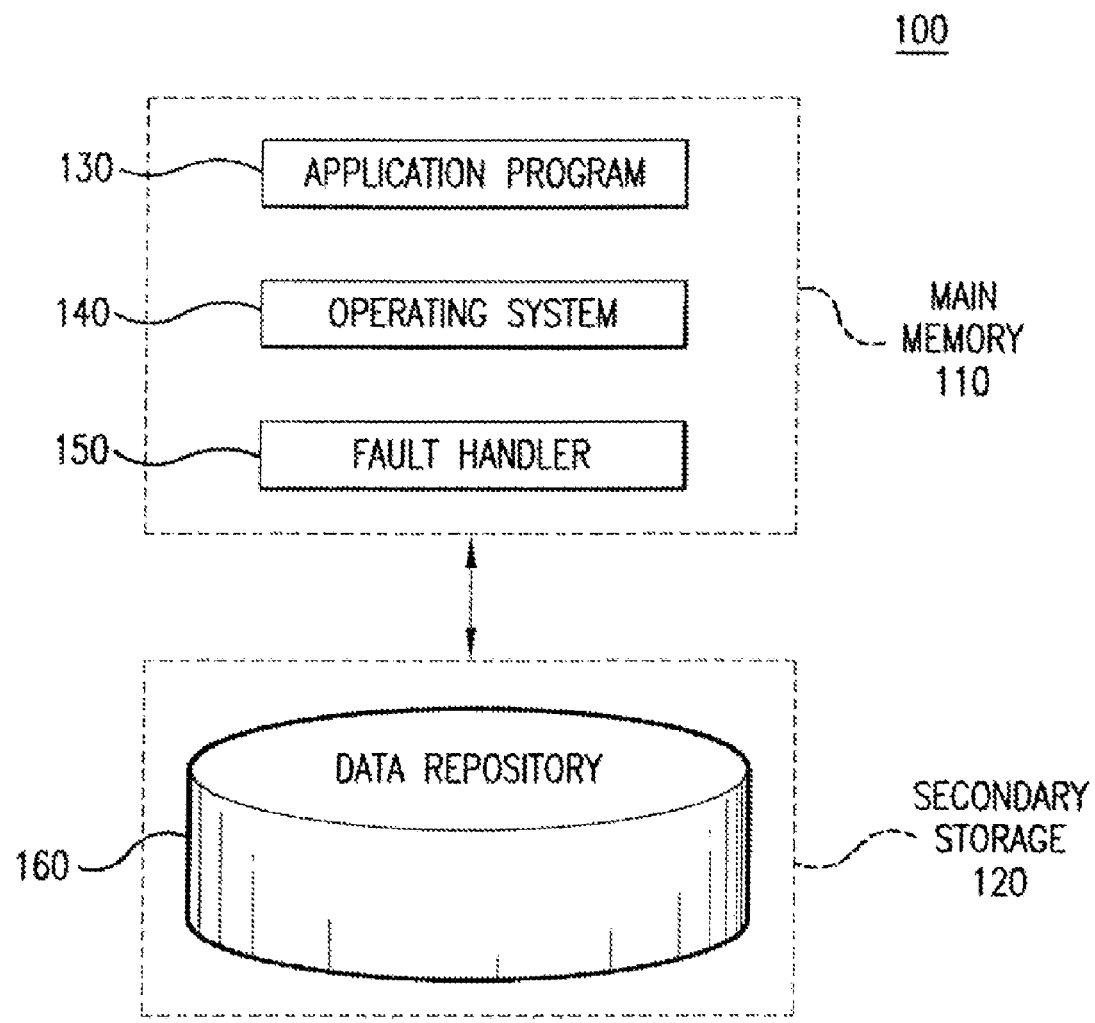

An embodiment of the present invention is an improvement of the prior SAGA product. In an embodiment of the present invention, the Multi-Writer In-Memory Non-Copying Database (MIND) enables multiple non-conflicting changes to be written concurrently to an existing persistent database of, for example, C++ objects. While reads from an in-memory database are extremely rapid, writes to an in-memory database may require the creation of disk-based logfiles for crash recovery purposes; therefore, to scale SAGA for larger data volumes, the present invention uses multiple simultaneous writers with each writer updating its own logfile, so that the effective disk writing speed is increased and lock conflicts are reduced. Embodiments of the present invention may use a plurality of writing processes to simultaneously update a plurality of objects in the data repository, wherein each writing process writes to one object at a time, and wherein the objects in the data repository are divided into a plurality of genera, and where each genera has its own transaction log and lock object, and wherein file segments in the data repository are not copied into a main memory from the data repository when needed by the application program and are instead read, updated, deleted or modified directly in the data repository by the application program. Each writing process writes only one object at a particular instant in time, and each writing process writes only to its own objects, but typically a number of objects are written sequentially, one at a time, by a single writing process in a typical transaction.

In the present invention, a writer may write to volatile memory and to a disk based log file to be used in case a crash wipes out the volatile memory. Each writer may have its own log file on disk, so no locks may be need for the log files. Lock conflicts may occur only when the writers are writing to volatile memory, but that may be the fastest part of the writing process, so that these lock conflicts are of short duration.

To scale SAGA for larger databases, the present invention uses a multiplicity of writing processes operating simultaneously. The reading processes are not encumbered by read-locks, and the writing processes succeed or fail in their respective tasks without impacting each other. A coherent data appearance may be maintained at all times without the need to make temporary local copies of the data that is being altered by the writing processes.

The MIND database may be accessed simultaneously by a multiplicity of reading processes located on a multiplicity of computers without the need for read locks. Users may be given access to the original objects, not copies, so that all contained objects may be accessible at memory speeds, and each object may have the full virtual functionality of normal C++ objects. The integrity of the underlying database may be protected by the computer hardware itself.

An embodiment of the present invention is found in Geneva 8.5, available from Advent Software, Inc., of San Francisco Calif. Geneva 8.5 is an international portfolio management software product which incorporates SAGA as an in-memory database populated with C++ objects. The SAGA database may use various techniques to make stored objects that normally reside on disk files appear as if they always reside in memory.

In embodiments of SAGA, objects may be linked together by pointers so that objects rarely need to be searched for by key. Objects may be found by following the pointers from other objects, which may reduce object access time to the sub-microsecond range. By utilizing virtual memory fault logic already present in modern computer hardware, an object may appear in memory when it is referenced by a pointer from another object, without the need for any database-related application-programming interface (API). In addition, the database objects may maintain their full C++ virtual function capabilities no matter which processes attach to the database, without the use of special loader directives.

Prior to the present invention, SAGA supported an unlimited number of simultaneous reading processes on a multiplicity of computers, but only one writing process, or writer.

SAGA may contain objects that are persistent, i.e., they exist independently of processes that may be accessing them. Once entered into the database, objects may never be removed. When an object is entered into the database it may be given knowledge begin and end times. An object's knowledge begin time may be set to the moment when the object enters the database and the end time may be set to infinity. If the object is subsequently updated, the knowledge end time of the original object may be set to the current moment, as is the knowledge begin time of the new version. Both the new and old versions of the object may be "variants".

There may be an unlimited number of variants of an object, each with its own non-overlapping knowledge begin and end times. Each variant may point to the next variant older than itself and also to a linkage object that points to the newest variant, so that the entire chain of variants can be traversed if desired.

Since objects may never be deleted from the database, it may always be possible to travel in time to see what the database knew at a given moment in the past. This may allow the user to recreate past reports for audit purposes.

SAGA objects may point to each other directly using memory addresses. For example, a portfolio object may point to its portfolio events, such as buys, which in turn may point to the investments that are being purchased. These object pointers may actually be small objects themselves that can contain their own knowledge begin and end dates.

One Writer Versus Multiple Writers

Altering the database may require performing a transaction. When SAGA used one writing process, the transaction acquired the write lock on the SAGA database, wrote a transaction header to the logfile, wrote change instructions to the logfile, altered the in-memory database, closed the logfile, and released the database lock, returning to the user only when all steps had been successfully completed.

When multiple users access Geneva simultaneously, several may attempt to alter the SAGA database at the same instant. Various heuristics may be used to avoid long delays when using only one writing process, and only one write lock. For example, the lock logic penalized a frequently writing process by delaying its access to the write lock if other writers had unsuccessfully asked for the lock. Even so, a single transaction loading a massive block of data into the database could noticeably delay new users who were logging into Geneva, as logging in creates a user session object, which requires a transaction to run.

The use of multiple concurrent writing processes may allow for multiple transactions to occur simultaneously while maintaining the microsecond class read performance of SAGA. Multiple writing processes may also continue to avoid the need for read locking.

Multiple Data Sets for Multiple Writers

To implement multiple writers in the present invention, the data objects in the SAGA database may be divided into sets, or genera, that may have restricted interaction with each other. It may be possible to update these minimally interacting sets without having to assert locks for the rest of the SAGA database. For example, multiple users can login to the SAGA database, load investment prices, and add other types of data, all simultaneously and without locking conflict.

For example, in the present invention in the SAGA database instance used by Geneva 8.5, objects may be divided into three genera: general, price, and login. Each genus may have its own write process, lock, logfile, and set of segment files. Each genus may also have its own write and read clocks. These features may allow objects to be altered or added simultaneously to any of the three genera of data with minimal interference. In certain unusual circumstances more than one lock may be asserted, but these situations may be infrequent and may be protected against deadlocks.

In addition, in the present invention, full visual coherency may be maintained for a multiplicity of users. No object may be visible to any of the other writers or readers until the transaction that is creating or altering it completes. This means that large streams of both pricing data and trading events can be entering the database while users are logging in and out of the database without impediment. Using this database, Geneva's three writers and a multiplicity of readers may all operate simultaneously with no interference and no need for copying data for the purposes of coherency.

In the event of a computer crash in the present invention, full recovery from the most recent checkpoint and the multiple genera logfiles may be simple because of the careful design of the transaction algorithm.

Conventional Systems and the Present Invention

In-memory databases may be the fastest possible databases, because any piece of information in an in-memory database may be available with almost zero latency. However, conventional in-memory databases may become excessively expensive when datasets are very large. In addition, there may be a limit to how much physical memory computer manufacturers can put into their computers, which may limit the maximum size of the dataset that can be stored in physical memory. In the present invention, SAGA's use of storage and linkage techniques may eliminate this size restriction by not only using disk storage to invisibly map the data into and out of the main memory in response to application reference patterns, but also by allowing task specific sub-databases to be constructed that can reference all objects in their underlying persistent database at memory speed.

In addition, in the present invention, a multiplicity of processes may have access to, share, and modify this data concurrently with no read locking and without interfering with each other, which may provide inherent scalability. A defined number of processes may write to the database simultaneously without causing lock interference to each other. The writing algorithm may provide full visual coherency without the need to create internal copies of the data being altered.

Some conventional database systems address data access performance problems by using software to place portions of their data in memory while keeping the majority on disk and by replicating data copies for each process that is using the data. While this approach solves one problem, it creates another in that complex software must keep track of the location of the objects being stored, moving copies of the in-memory objects back and forth from the disk. It also adds complexity and access delay time, as software must determine where to look for the object, in memory or on disk. In addition, desired objects must be copied to the application's memory space for data integrity and functional reasons, as users cannot be allowed direct access to the database copy of the object, whether it is found on the disk or in the memory cache.

Conventional database systems also maintain all their information in a unified set of tables, each containing one type of database object. These tables are joined to each other by linkages that must be implemented by software inside the database. It is not possible to take multiple databases and quickly attach them to each other so that all the objects in one database instantly know how to access relevant objects in the other database.

Other conventional database systems using multiple writers must save the old data so that other readers and writers do not see data that has not yet been fully committed by a writer that is in progress, since it is unknown whether some other process may want access to that data before a writing transaction is complete. This further adds to the overhead inherent in not providing each reader/writer access to the one and only copy of the object.

In the present invention, all data in the SAGA database may appear to be in the memory space of the application program; hence, objects may be read with zero latency as no copying may be necessary. Data may reside in only one place. While the data may appear to be in memory via the use of the virtual memory mapping facilities of the computer hardware, the data actually is also simultaneously on the disk. No complex software may be required to determine the residency of the data objects. If an object is referenced by the application and is not currently mapped into memory, the computer hardware, not software, may detect the fault and a small interrupt handler in the SAGA will map the appropriate disk file into memory. This mapping operation may also be done by the computer hardware, further simplifying the implementation. Since the manufacturers of modern computers rely on their virtual mapping hardware and page swapping for overall machine speed, use of these facilities to map data may result in the fastest possible performance for the application.

In embodiments of the present invention, the SAGA system with multiple writing processes permitted to write simultaneously may make use of relocated standardized C++ virtual function table pointers, memory-fault-driven memory-mapped file loading, and modification of the Knowledgebase pointer. This may allow both (1) immediate sub-database connection, map_private, and read-only file privileges to insure scalable parallel use of the data while maintaining interference free operation without read locking, and (2) the division of the data domain into genera that can be read and written concurrently without interference with each other or the need for data copying for coherency purposes.

Hardware and Software Platforms

In embodiments of the present invention, SAGA may be run on any computer hardware/software system that supports virtual memory, allows user programs to catch segmentation violations, and allows catching routines to restart the faulting application. This may include, for example, POSIX compliant systems, which include all varieties of Linux systems, Apple's Mac OS X, and Sun's Solaris, and may also possibly include later versions of the Microsoft operating systems as they claim to be POSIX compliant. The computer hardware may need to support 64-bit addressing, with at least 40-bits actually supported by the memory-mapping unit, allowing for direct access 1 Terabyte of data. The larger the number of bits actually supported by the memory-mapping unit, the greater the size of the supported database. For example, a modern computer with a 48-bit MMU can provide immediate access to 256 terabytes of data.

For example, Geneva with SAGA and multiple writers may be run on Sun and Fujitsu Ultrasparc 64-bit computer systems running Solaris 9 and 10, or on X64 architecture computers using either AMD or Intel processors.

If the disk subsystem holding the SAGA database or iBIS mapped files is connected to a NFS-based network (Network File System based network), the SAGA and iBIS may be read on multiple computers simultaneously. (iBIS is the Instantly Built Information Space product for database management from Advert Software, Inc., of San Francisco, Calif.) Only one computer may have authority to write to the SAGA database, though it may run multiple simultaneous writing processes. Authority to write may be manually switched from one computer to another. The system may also run on a SAN-based file system (Storage Area Network based file system) with clustering software, such as Veritas VxFS or Solaris QFS.

As described above, other approaches to using in-memory databases use software to cache portions of the data in main memory while holding the majority on disk. In addition, copies are made of the data and it is the copy that is actually given to the user. Transient data could be added to such a database and then joined via external keys into the persistent data in the database. This approach may give involve a substantial loss of speed and the creation of much more complex software. In addition, databases often hold copies of data being altered to provide coherent views of information to reading processes while it is being altered by writers.

A Transaction Locking Process

Figure 9:
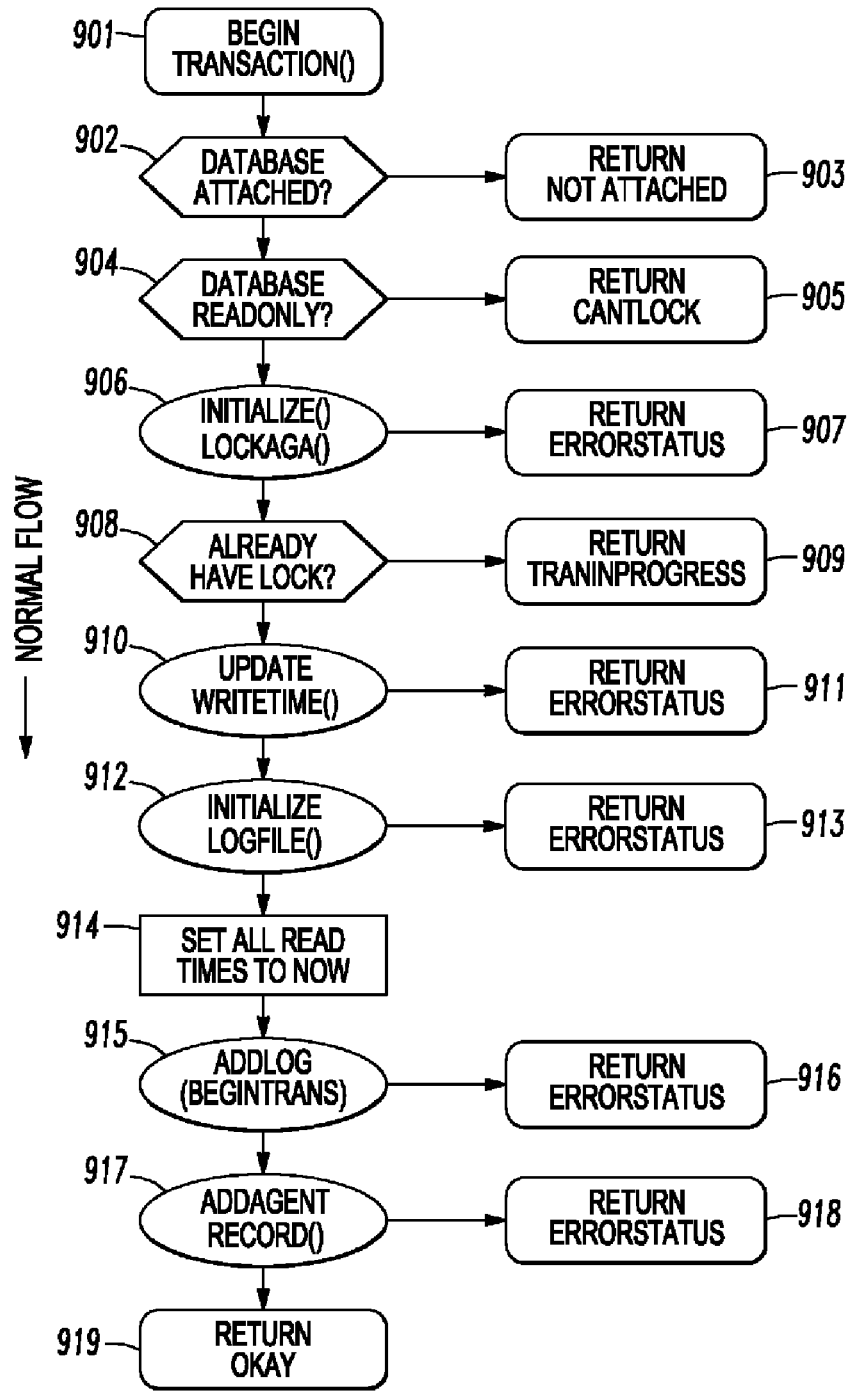
FIGS. 9-14 refer to aspects of the present invention.

FIG. 9 depicts an exemplary procedure for a transaction locking process for the present invention. When SAGA operates with a single writing process allowed to write at a given time, one main lock may be asserted whenever a process wants to start a transaction altering the SAGA database. In block 901, a transaction may start. A writing process may be attempting to write to the SAGA database. In block 902, the writing process may determine if the proper database is attached. If the proper database is not attached, flow proceeds to block 903, where the writing process may return a status of "NotAttached", indicating that the database the writing process is attempting to write to is not attached to the SAGA database. Otherwise, flow proceeds to block 904.

In block 904, the writing process may determine if the database is read only. If the database is read only, flow proceeds to block 905, where the wiring process may return a status of "CantLock", indicating that the database is read only, and therefore cannot be locked for writing. Otherwise, flow proceeds to block 906 and block 907. In block 906, the writing process may initialize a lock on the database, and in block 907, the writing process may return any error status generated during the writing processes' attempt to lock the database. Initializing a lock on the database, as in block 906, may be further described in FIG. 10.

In block 908, the writing process may determine if the database already has a lock on it. If the database already has a lock on it, flow may proceed to block 908, where the writing process may return a status of "TranInProgress", indicating that another transaction is currently in progress and has a lock on the database. Otherwise, flow proceeds to block 910 and block 911.

In block 910, the writing process may update the object being written to, along with the time the object was written to, and in block 911 the writing process may return any error status generated during the writing of the object. In block 912, the writing process may initialize the log file, which may be the file in non-volatile memory used by the writing process to log all transaction in case the volatile memory is erased or corrupted, and in block 913 the writing process may return any error status generated during initialization of the log file.

In block 914, the writing process may set all read times to the current time. In block 915, the writing process may add an entry to the log for the current transaction, and in block 916, the writing process may return any error status generated during the writing of the entry to the log. In block 917, the writing process may add an agent record, and in block 918 the writing process may return any error status generated during the addition of the agent record. In block 919, the writing process may have completed the transaction, and may return a status of "Okay", indicating that the transaction completed successfully with no errors.

Groups of Database Objects

To use multiple simultaneous writing processes, object types in the database may be divided into groups based on their affinity for each other. Each type of object group, or genera, may have its own locking object that is automatically selected by a virtual function. This locking object may contain the lock, numerous status fields, and a pointer to a corresponding log file. All the log and lock related functions may be made member functions of these lock objects. This may allow the reuse of the locking logic for a single writing process described above.

In Geneva, price objects may be numerous and have limited interaction with other objects, so they may be made their own genera and may have their own lock object. Objects related to user logins may also have their own genera and their own lock object. Of the objects not in these two classes, only portfolio event objects may be numerous enough to require special treatment, so all the objects that are not price objects or user login objects may have a third lock object that is shared with portfolio event objects.

Distribution of the Locked Resource

There may be hundreds of writing processes contending for the single lock when SAGA uses only one writing process or the multiple locks when SAGA uses multiple writing processes permitted to write simultaneously. To fairly distribute the locked resource two techniques may be used.

If a writing process asks for the lock and the lock is in use, the writing process may sleep for a random period of less than 25 milliseconds. In addition, the locking writing process may be declared to be a penalty writing process. A penalty writing process may be forced to sleep the next time it asks for the lock.

By causing writing processes to sleep randomly, processors may not be saturated making continual calls for the lock and the processes are randomized so that the lock may be shared fairly. Locking operations may use an atomic memory-register swap instruction that may generate substantial main memory traffic if used continually. Using random sleep times may prevent this.

Penalizing the locking writing process may ensure that a writing process does not continually ask for a lock as soon as the writing process releases the lock, if there are other writing processes waiting for the lock. Without this penalty, an industrious writing process may always have the lock since the writing process' probability of finding the lock unlocked after releasing the lock only microseconds before would be much higher than that of a waiting writing process that may be sleeping for many milliseconds.

A Lock with Sleep and Penalties

Figure 10:
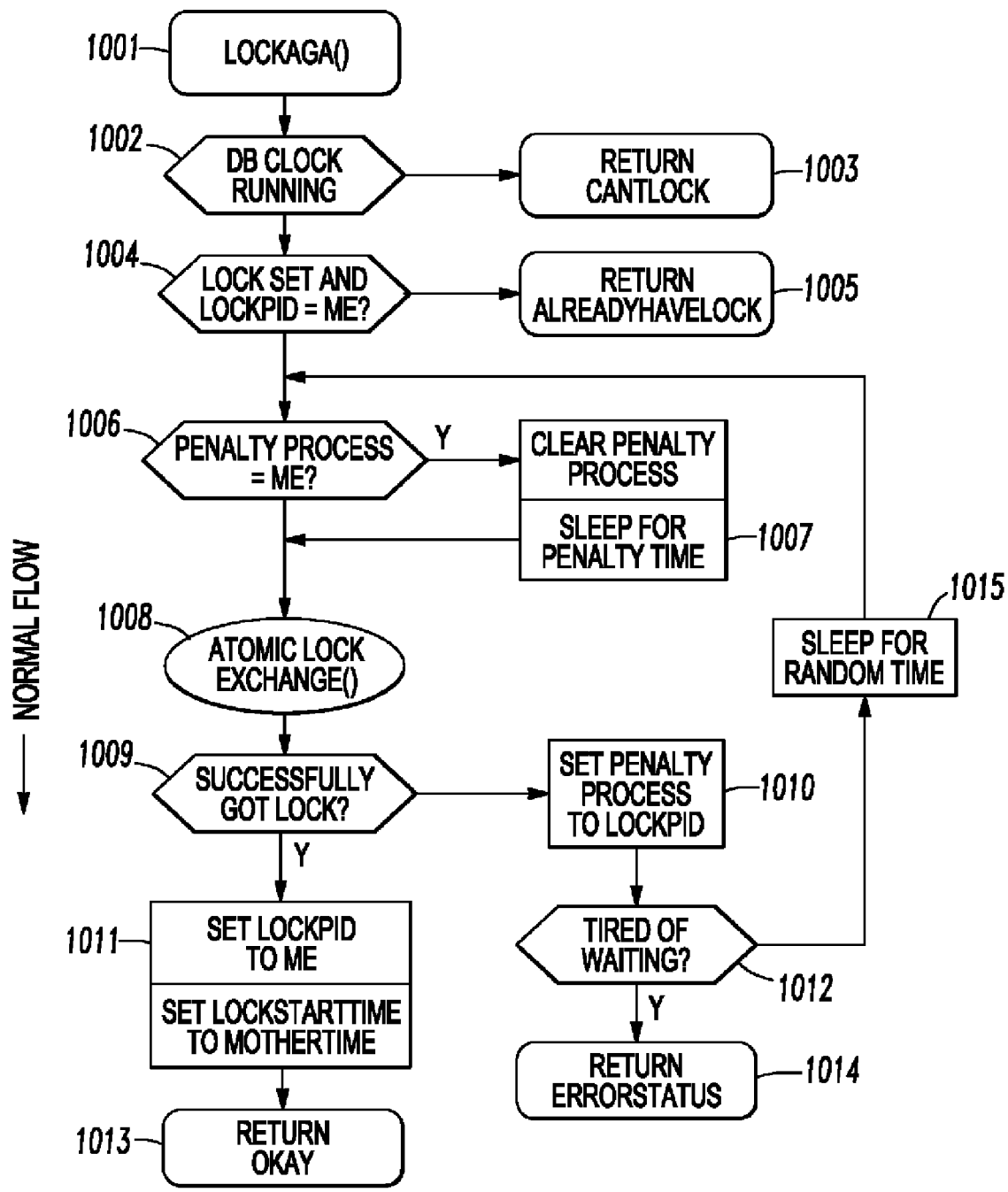

FIG. 10 depicts an exemplary procedure for obtaining a lock with sleep and penalty process techniques for the present invention. In block 1001, the writing process may run the LockAGA function, which may attempt to obtain the lock on the database, as in block 906. In block 1002, the writing process may determine if the database clock is running. If the database clock is not running, flow proceeds to block 1003, where the writing process may return a status of "CantLock", as the writing process may be unable to obtain the lock on the database. Otherwise, flow proceeds to block 1004.

In block 1004, the writing process may determine if any writing process already has a lock on the database, and if so, if the writing process itself already has the lock. The writing process may check the lockpid, which may contain the process id of the writing process that has the lock on the database. If the writing process already has the lock on the database, flow proceeds to block 1005, where the wiring process may return a status of "AlreadyHaveLock", indicating that the writing process already has the lock. Otherwise, flow proceeds to block 1006.

In block 1006, the writing process may determine if it is a penalty process. If the writing process is not a penalty process, flow proceeds to block 1008 directly. If the writing process is a penalty process, flow proceeds to block 1007, where the writing process may clear the penalty process status from itself, and may sleep for an amount of time designated for penalty processes before flow proceeds to block 1008. In block 1008, the writing process may run the Atomic lock exchange function, which may attempt to obtain the lock object, thereby locking the database for the writing process. In block 1009, the writing process may determine if the lock object was successfully obtained. If the lock object was not successfully obtained, the writing process may not have the lock on the database because another writing process has the lock, and flow proceeds to block 1011. Otherwise, flow proceeds to block 1010.

In block 1010, another writing process may have the lock, as indicating by the lockpid associated with the lock. This may be the locking writing process. The locking writing process with the lock may have its status changed to a penalty process.

In block 1012, the writing process may determine if it has waited long enough for the locking writing process to release the lock on the database. If the writing process has not waited long enough, flow proceeds to block 1015, where the writing process may sleep for a random period of time before flow proceeds back to block 1006 and the writing process against attempts to obtain the lock object. Otherwise, flow proceeds to block 1014, where the wring the writing process may return an ErrorStatus, indicating that the writing process was unable to obtain a lock on the database.

In block 1011, the writing process may have successfully obtained the lock, and may update the lockpid to indicate the writing process is now the locking writing process. The writing process may also set the lockstarttime, which may indicate the time at which the writing process obtained the lock, to the current time, or mothertime. The flow then proceeds to block 1013, where the writing process may return a status of "Okay", indicating that the writing process has obtained the lock on the database.

When implementing multiple simultaneous writing processes for a SAGA database, the data object universe of the database may be divided into three genera: general, price, and login. Alternatively, the SAGA database can be divided into more than three genera.

A lock, a transaction logfile, read and write clocks and SAGA memory segments may be associated with each genus. This may be implemented by, for example, using virtualized instances of the logic used for SAGA with a single writing process. The segment creation lock may be set momentarily whenever a new segment is being constructed. Since each segment can point to multiple segment files, each holding 16 megabytes of data, this may occur very infrequently.

SAGA with One or More Writers

Figure 11:
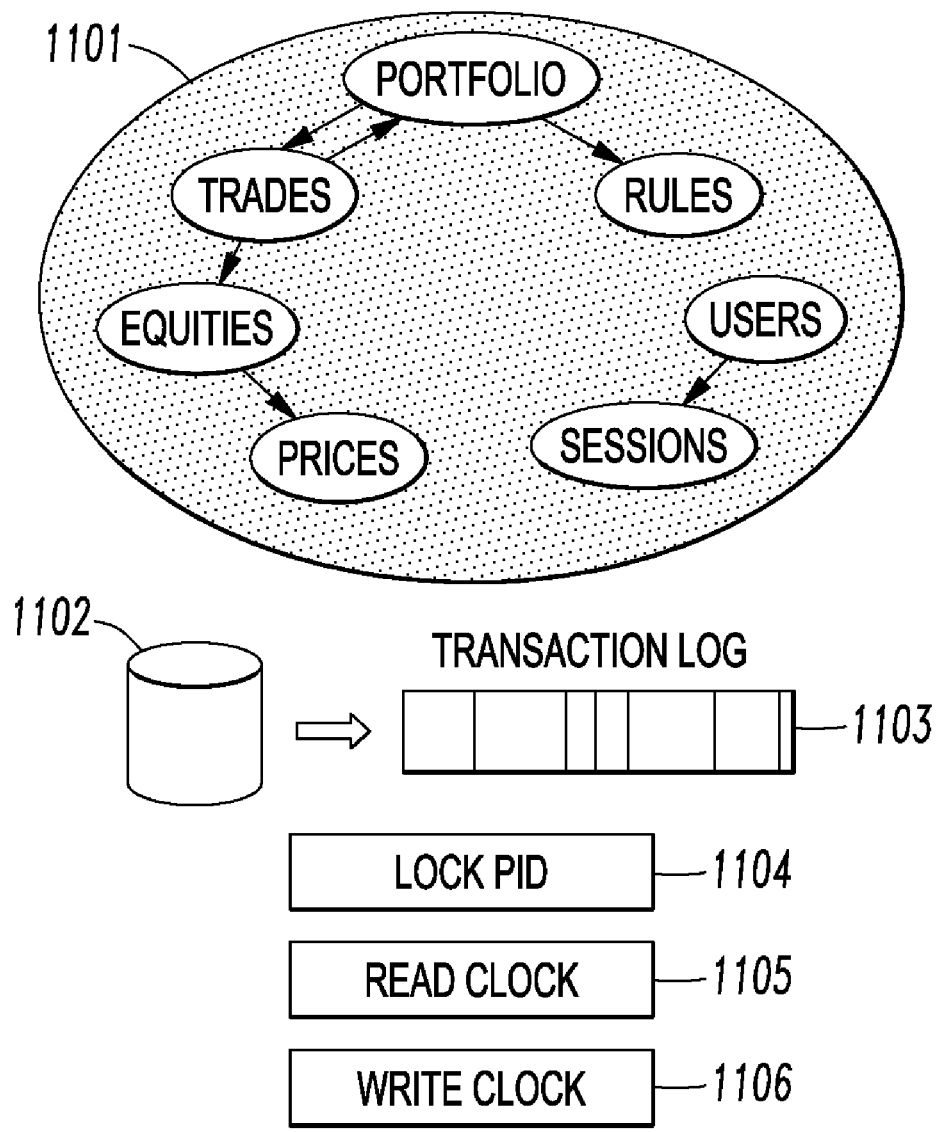
Figure 12:
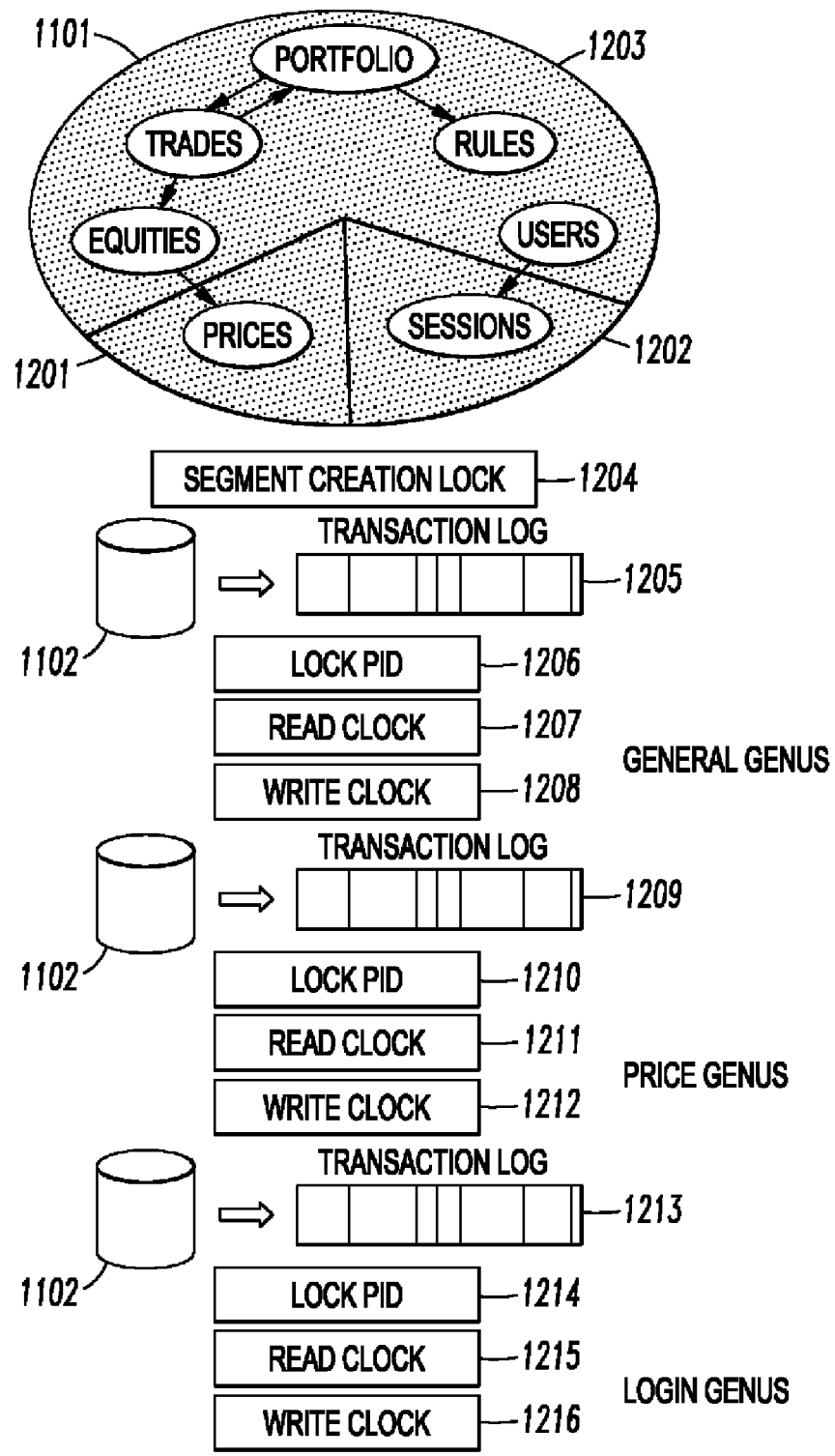

FIG. 11 depicts an exemplary representation of SAGA with a single permitted writing process. FIG. 12 depicts an exemplary representation of SAGA using multiple simultaneous writing processes for the present invention. As depicted in FIG. 11, when a SAGA database 1101 allows only one writing process to write at a given time, the SAGA database may have one associated transaction log 1103 written to non-volatile memory 1102, which may be, for example, a hard drive. The SAGA database 1101 may also have a single lock pid 1104, which may indicate which writing process has obtained the lock for the entire SAGA database 1101, and a single read clock 1105 and a single write clock 1106. When a writing process wishes to write to the SAGA database 1101, the writing process may obtain the single lock, and lock the entire SAGA database 1101 and all the objects therein, until the writing transaction is completed. The writing process may record the transaction in the transaction log 1103.

As depicted in FIG. 12, when a SAGA database 1101 permits multiple simultaneous writing processes, the SAGA database 1101 may be divided into, for example, three genera. A genus 1201 may include all price objects, a genus 1202 may include all user session objects, and a genus 1203 may include all other objects not included the genus 1201 or the genus 1202. A segment creation lock 1204 may be used to lock the entire SAGA database 1101 during the creation of a new segment.

Each of the three genera may have an associated transaction log, lock pid, read clock, and write clock. For example, the genus 1203 may have a transaction log 1205, a lock pid 1206, a read clock 1207, and a write clock 1208. When a writing process wishes to write to an object in the genus 1203, for example, an equity object, the writing process may first need to obtain the lock on the genus 1203, resulting in the lock pid 1206 of the genus 1203 being set to the writing process. The writing process may record any transactions on objects in the genus 1203 to the transaction log 1205.

The genus 1201 may have a transaction log 1209, a lock pid 1210, a read clock 1211, and a write clock 1212, and the genus 1202 may have a transaction log 1213, a lock pid 1214, a read clock 1215, and a write clock 1216. These may function in the same way as the transaction log 1205, lock pid 1206, read clock 1207 and write clock 1208, for their respective genera. For example, to write to an object in the genus 1201, the writing process may need to obtain the lock on the genus 1201, resulting in the lock pid 1210 of the genus 1201 being set to the writing process. The writing process may record the transaction on an object in the genus 1201 to the transaction log 1209.

Because each of the three genera has a separate lock and transaction log, it may be possible for three separate writing processes to each write to one of the three genera simultaneously. A writing process may obtain a lock on one of the three genera without preventing another writing process from obtaining a lock on one of the other two, as the whole SAGA database 1101 may not be locked unless a process obtains the segment creation lock 1204. For example, a first writing process may obtain the lock to the genus 1201, update a price object, and record the transaction to the transaction log 1209, at the same time as a second writing process obtains the lock to the genus 1202, updates a user login object, and records the transaction to the transaction log 1213, and a third writing process obtains the lock to the genus 1203, updates an equities object, and records the transaction to the transaction log 1205.

When objects from one genus point to objects in another genus, special ynode pointers that are insensitive to locking synchronization between the groups may be used. These ynode pointers may allow transactions from one genus to roll back without impacting the other genus. This may allow for multiple transactions to occur simultaneously without the need for read locking or local copies of the database.

Multiple Locks and Y-Nodes

Figure 13:
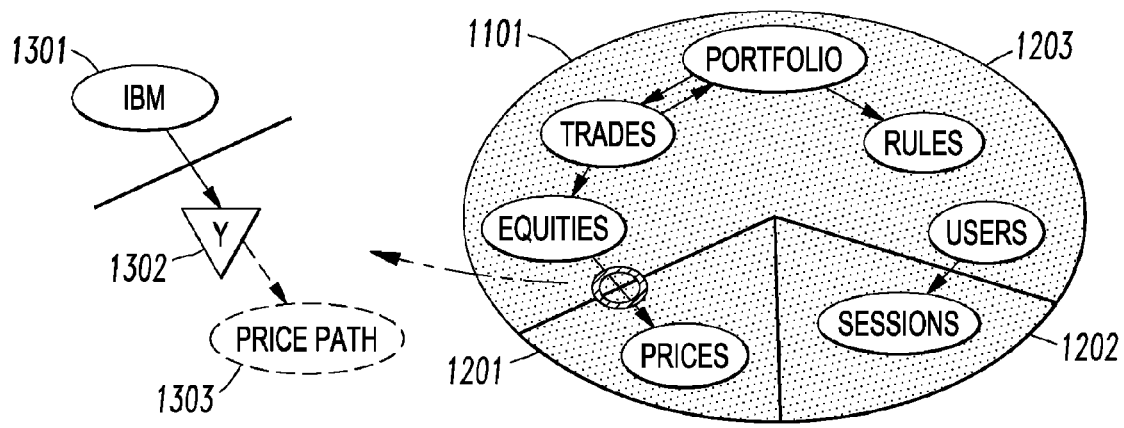

FIG. 13 depicts an exemplary representation of using multiple locks for the present invention. When an object in one genus might reference an object in another genus, multiple locks may need to be asserted. For example, an equity object 1301, "IBM" may be created in the SAGA database 1101, in the genus 1203, and may eventually want to access price objects in the genus 1201. A special Y-node 1302 may be created in the genus 1201 with the price objects, and may connect the two genera. This special Y-node 1302 may be legal even when it points at nothing. No other Y-nodes may be allowed to have such a null linkage.

When creating the Y-node, it may be necessary to assert the locks for both genera the Y-node will link. For example, the lock for the genus 1203 and the genus 1201 may be needed to create the Y-node 1302 to link the equity object 1301 and price objects 1303 that will eventually be created for the equity object 1301. To create the Y-node 1302 and link the equity object 1301 and the price objects 1303, the lock on the genus 1203 may be obtained, and the equity object 1301 may be created in the genus 1203. The lock for the genus 1201 may be obtained, and the Y-node 1302 may be created with a null link in the genus 1201. The lock on the genus 1201 may be released, and Y-node 1302 may be connected to the equity object 1301. The lock on the genus 1203 may then be released.

Prices may then be added to the equity object 1301 for IBM without ever needing to assert the lock for the genus 1203 again, as the price objects 1303 may be created in the genus 1201 and linked to the Y-node 1302, instead of having to be linked to the equity object 1301. A deadlock may never occur because an object would not be created in the genus 1201, including the price objects, unless a referencing object in the genus 1203 already existed.

When a transaction is in progress, an object being added to any genus may need a new segment, for example, a new portfolio object may want to create its own segment of trades. If this situation occurs, the segment creation lock 1204 may be asserted while the segment counter in the database object is incremented. This action may create a Segment Creation transaction in the appropriate log file, but may not write the new segment number anywhere since recovery may apply the multiple log files in such a way that the currently assigned segment number would no longer be appropriate.

Read Clock and Write Clock

When SAGA has a single permitted writing process at a time, there may be two clocks, read and write, for example, the read clock 1105 and the write clock 1106 as depicted in FIG. 11. The read clock 1105 may indicate the most recent time at which there was no writing process in progress. All reading processes may use the read clock 1105 when searching for visible objects. If an object's begin time was beyond the time indicated by the read clock 1105, the reading process may not see it. The write clock 1106 may indicate the time at which the writing process began its transaction. The writing process may use this time as its visibility time, so that writing process could see anything that the writing process had just written as well as all the objects that the readers could see. When a transaction completes successfully, the value of the write clock 1106 may be transferred to the read clock 1105 so that all processes could see the newly written objects.

When using multiple simultaneous writing processes, each genus may have its own read clock and write clock, for example as depicted in FIG. 12. The visibility of an object may be determined by the read clock of the appropriate genus. For example, when determining the visibility of an equity object, such as, for example, equity object 1301 for IBM, the read clock 1207 for the genus 1203 may be used. If the link from the equity object 1301 is followed to the Y-node 1302, and then to the price objects 1303 in the genus 1201, visibility of the price objects 1303 may be controlled by the read clock 1211 for the genus 1201.

The read clocks and write clocks for the genera may be managed in the same general manner as when SAGA uses one writing process, except that any finishing genus transaction may set the write time of the genus 1203 as well as the genus' own read time if the write time exceeds that of the genus 1203.

For example, three transactions may overlap each other. Since all three transactions are for different genera, the writing processes for the transactions may all run simultaneously with no interference. Each writing process may record a summary of the changes to the corresponding transaction log. The transactions on objects in the genus 1201 and the genus 1202 may update the write clock 1208 of the genus 1203 when they finish. If a transaction on objects in the genus 1203 is not running, the read clock 1207 of the genus 1203 may also be updated. If a rollback occurs for any of the transactions, this may not impact the other transactions as they all have separate transaction log files and clocks.

In the event of a computer crash, the SAGA database may recover by applying all of the transaction log files to the most recent checkpoint file. Since a segment number may not be recorded when a new segment is created, the transaction log files may be applied in any sequence.

A Transaction Sequence

Figure 14:
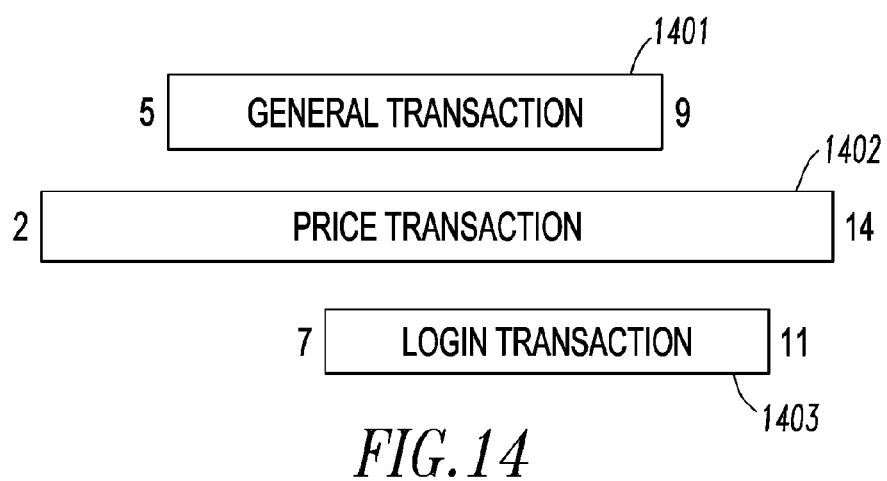

FIG. 14 depicts an exemplary transaction sequence for the present invention. Each transaction log file is applied until its last valid transaction is read. The last valid transaction may be the transaction that has both begin and end transaction records. The latest valid transaction may set general read time.

For example, the transaction log 1209 for the genus 1201 and the transaction log 1213 for the genus 1202 may have successfully completed for the transaction sequence depicted in FIG. 14, but the transaction log 1205 for the genus 1203 may have failed. The last transaction in the transaction log 1205 for the genus 1203 may be transaction 1401, which may have begun at time 5 and finished at time 9. The last transaction in the transaction log 1209 for the genus 1201 may be transaction 1402, which may have begun at time 2 and ended and time 14. The last transaction in the transaction log 1213 for the genus 1202 may be transaction 1403, which may have begun at time 7 and finished at time 11. If the computer crashed and recovery was performed, the read clock 1215 and the write clock 1216 for the genus 1202 may be set to 11, reflecting the end time of the transaction 1403. The read clocks 1207 and 1211 and the write clocks 1208 and 1212 for the genera 1203 and 1201 may be set to 14, reflecting the end time of the transaction 1402. The transaction 1402 may be the last valid transaction and may therefore set the clocks not only for the genus 1201 to which the transaction 1402 belongs, but also for the general genus 1203.

The Prior SAGA Invention

Embodiments of the prior SAGA invention used only one write process at a time to write changes to the database. With increasing large data volumes, delay could be caused by the system waiting to write many changes to the database. The present invention is an improvement of the prior SAGA system; and the present invention can use multiple write processes to simultaneously write multiple changes to the database while minimizing write locks, thus reducing delay with very large data volumes. An understanding of the present invention with multiple writers requires an understanding of the prior SAGA system with only one writer.

In an embodiment of the prior SAGA invention, data of a database is stored exclusively in secondary storage of a computer, not in main memory in the CPU. Instead, data is transparently mapped into and out of the main memory, but not copied into the main memory, in response to reference patterns of an application program. Because of this mapping, the data can be directly accessed by an application program at speeds close to those achievable if the data resided in the memory space of the application program; and, therefore, no copying of data need occur between secondary storage and main memory. As such, objects can be read by applications directly out of secondary storage with near zero latency, and without the database size restrictions of existing systems that copy database data into main memory.

In an embodiment of the prior SAGA invention, memory interrupt and virtual memory mapping facilities of computer hardware may be employed to make data appear to be in main memory when it actually resides in disk files on disk. That is, data can be accessed by applications directly out of secondary storage at speeds closely approximating existing systems that copy data into main CPU memory. No complex software is required to determine the residency of the data objects. The database may have an associated small fault or interrupt handler. If an object referenced by an application is not currently mapped into memory, the computer hardware, not software, will detect the fault. Then, the fault handler of the prior SAGA invention will transparently map the appropriate disk file address into memory. Since the manufacturers of modern computers rely on virtual mapping hardware and page swapping for overall machine speed, use of such facilities to map database data results in the fastest possible performance for the application.

Embodiments of the prior SAGA invention can greatly reduce the amount of database data that needs to reside in main CPU memory at any one moment. Accordingly, embodiments enable scalability to far larger datasets in secondary storage than previously possible, as well as the use of smaller, less expensive systems to perform current processing requirements. TCO (Total Cost of Ownership) is thus reduced. Database startup time is also greatly reduced, for data is placed in main memory only as needed, rather than loading all the data into memory before any processing can occur. Users also can reliably log into the database system even during periods of high volume transaction loading.

Embodiments of the prior SAGA invention may be used in connection with applications that interact with databases, such as investment portfolio management applications, for example.

In an embodiment of the prior SAGA invention, a database may be structured as a plurality of memory-mapped file segments stored on at least one nonvolatile memory medium. The file segments may include objects that are directly interconnected by memory pointers into one large matrix of information.

In an embodiment of the prior SAGA invention, a database data repository includes a plurality of memory-mapped file segments stored on at least one nonvolatile memory medium. An application program connects to the data repository. A fault handler associated with the data repository is registered with the operating system of the application program. The fault handler catches a segmentation fault that is issued for an object referenced by the application program and resident in the data repository. A file segment corresponding to the referenced object is found and mapped into main memory. The application program is restarted at the interrupt location at which the segmentation fault was issued. Because data is transparently mapped into and out of the main memory without copying the data, objects may be read with near zero latency, and size restrictions on the database may be eliminated.

Although various embodiments of the prior SAGA invention are discussed in connection with portfolio management systems, it is to be appreciated that the present teachings may be implemented in any context which utilizes databases, such as, for example, a trade order management system (TOMS) or partnership accounting system.

Various embodiments of the prior SAGA invention have been implemented by Advent Software, Inc. (of San Francisco, Calif.) as the Geneva Segmented Advent Global Area (SAGA). Geneva is a portfolio management system that is used by institutions involved in the trading of investments.

FIG. 1 shows a hardware and software schema 100 according to an embodiment of the prior SAGA invention. The schema 100 includes a main memory 110 and secondary storage 120. Resident in the main memory 110 is an application program 130, an operating system 140, and a fault handler 150. The secondary storage 120 includes a data repository 160.

The application program 130 is programmed to access the data repository 160. The fault handler 150 is associated with the data repository 160 and registered with the operating system 140. In an embodiment, the fault handler 150 is not native to the operating system 140, which may include its own fault handlers. Instead, the fault handler 150 is written particularly to enable interactions between the application program 130 and the data repository 160.

In an embodiment of the prior SAGA invention, the data repository 160 includes various file segments. At any one time, some file segments are mapped into the main memory 110, and other segments are not.

In an embodiment of the prior SAGA invention, when the application program 130 references an object that resides in the data repository 160, but is not currently mapped into the main memory 110, a segmentation fault is issued by the computer hardware at an interrupt location in the application program 130. The fault handler 150 is able to catch the segmentation fault. The fault handler 150 then finds a file segment of the data repository 160 that corresponds to the referenced object. That file segment is mapped into the main memory 110, and the application program 130 is restarted at the interrupt location.

In an embodiment of the prior SAGA invention, various software components of the schema 100 may be written in an object-oriented programming language, such as C++ or another such language.

Figure 2:
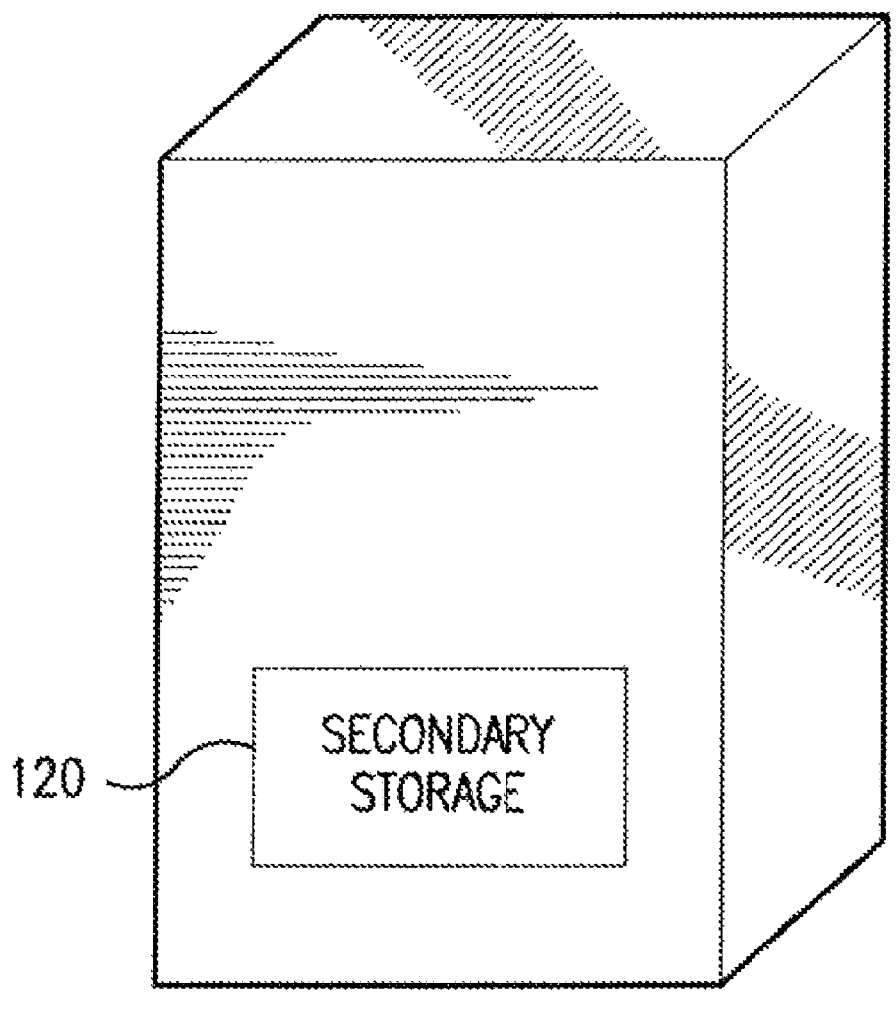

FIG. 2 illustrates a system 200 according to an embodiment of the prior SAGA invention. The system 200 is an example hardware implementation of the schema 100 of FIG. 1.

The system 200 includes an application and database server 210. The server 210 includes the secondary storage 120, and may provide a platform for the application program 130, the operating system 140, and the fault handler 150 (not shown) of the schema 100 in FIG. 1. It is to be appreciated that the system 200 may be implemented on one or multiple computers and/or storage devices.

In an embodiment, the system 200 runs on Sun UltraSPARC or Fujitsu computer systems running Solaris 8 or 9. In general, embodiments herein may be implemented on computer hardware/software systems that support virtual memory, allow user programs to catch segmentation violations, and allow catching routines to restart a faulting application by retrying the instruction that caused the segmentation violation. For instance, embodiments may involve POSIX-compliant systems, such as all varieties of Linux systems, Apple's Mac OS X, Sun's Solaris, and Microsoft NT, and its derivatives such as Windows 2000 and XP. In addition, the computer hardware of the system 200 may support 64-bit addressing, with at least 40 bits actually supported by the memory-mapping unit of that hardware. Accordingly, the system 200 may directly access 1 terabyte of data. The larger the number of bits actually supported by the memory-mapping unit, the greater the size of the supported database. Sun SPARC systems, for example, support a 44-bit memory mapping unit, which means that such systems can provide immediate access to 16 terabytes of data. In an example implementation, the computer I/O system of the system 200 can provide at least 3 megabytes/second of data transfer.

Returning to the schema 100 of FIG. 1, in an embodiment, data is stored in the data repository 160 in the form of interconnected C++ objects. The objects can be accessed directly by an executing C++ program (e.g., the application program 130) and used as if they were part of the program's local memory. All the stored objects are directly interconnected by memory pointers into one large matrix of information. Only rarely is information searched for as in the classic database model, since almost all information is already pre-linked in the patterns in which it will be used. Unlike relational databases, which may use redundant data tables to represent these pre-linkages, any given data object in the data repository 160 is stored only once. This greatly reduces the total amount of storage required, eliminates database internal consistency problems, and simplifies software development.

In an embodiment, each object in the data repository 160 has knowledge times (time stamps) associated therewith, indicating when the object was first entered in the database and when it became invalid. Data may become invalid when it is deleted (expired) or updated (superseded by a new variant). This temporal information allows the user to effectively move in time, permitting the reproduction of reports as they would have appeared at any time in the past. In an embodiment, each object has a header defining such knowledge times.

The application program 130 may attach to the in-memory data repository 160 and map that repository into the virtual memory space of the application program 130. It then accesses the repository objects as if all of them were part of its own memory. The repository objects need not be copied before being given to the application program 130 since they are protected from alteration by memory hardware. An unlimited number of copies of the application program 130 can attach to this shared memory simultaneously. Only one copy can write at any one instant.

Inside each object is a virtual function pointer that points to a shared memory area that holds the virtual function tables, including virtual functions associated with object types. This pointer technique allows a data repository object to work transparently for any application that touches it. When an application attaches to the data repository 160, a startup routine copies the virtual function table from the application to a specific address in this shared memory, based on an ObjectType field that is stored in each object. Each object in the data repository 160 had its virtual function pointer altered to point to this specific address when it was placed into the data repository 160. Accordingly, each object will now automatically find the correct virtual function definitions for the application that is using it, even if they have changed from the time when the object was originally placed in the knowledgebase.

Each object also may have a pointer to itself. This allows an object to be asked for its shared memory address, no matter if the object is already in shared memory or it is a local copy. The code need not worry about the actual residency of the object because it will always get a consistent answer.

Objects can be associated with each other by links. In an implementation, there are three types of linkages in the data repository 160. Y Nodes define the start of like types of objects; X Nodes connect to particular object instances; and Z Nodes are implicit in the objects themselves, pointing from one variant of an object to the next. (Y Nodes actually contain the first X Node as part of themselves. They are shown separately below to more clearly reveal the underlying paradigm.) Linkages may come in a number of variations: zero-or-once, once, once-or-many, zero-or-once-or-many. For example, in a portfolio management embodiment, a Buy can buy one and only one Investment. The link between a Buy and an Investment would therefore be of type "once". Linkage variation rules are enforced at the time that objects or links are placed into the data repository 160.

In another example, the Buy of a stock may be made in terms of US Dollars (USD). To represent this relationship, the Buy object is linked to the MediumOfExchange object USD by an X node. Each X node has its own KnowledgeBegin and KnowledgeEnd dates, as two objects that have independent existence can be linked to each other for a given period of time and then that linkage may be terminated. For example, BMW was originally traded in Deutsche Marks (DM), but is now traded in Euros (EU). The default trading currency linkage for BMW originally pointed to DM, but that X node link was expired and a new one was added pointing to EU.

In an embodiment, each object in the data repository 160 has a number of header fields that identify the object, its virtual functions, where it is stored, and how to detect if it has been corrupted. The header contains the following example fields:

| Field | Description |
| --- | --- |
| ObjectType | Identifies the class of this object. (A maximum of 65,000 object types may be supported.) |
| ObjectSync | A 16-bit pattern chosen by statistical analysis to be least likely to appear in a knowledgebase. Used to assist in identifying the start of objects if data corruption occurs. |
| SegmentId | Associates this object with a particular repository segment. The default value for this field is zero. |
| Vpointer | C++ creates this field, which is a pointer to the virtual function table. The data repository 160 rewrites this pointer, when the object is being stored, so that each class's objects always point to a specific shared memory address. This allows an object to be given directly to many applications. |
| TreeCursor | Points to a unique X node, which, in turn, points to the first object in a stack of temporal variations of the same object. |
| Roles | Set of 16, 2-bit, user-role masks determining which user roles can read, write, or delete this object. |
| HashKey | A 16-bit numerical value that provides fast go/no-go matching when looking through a pile of objects for one that matches a given primary key. |
| CheckSum | A 32-bit value that is initially computed when an object is placed in memory. If the object and its checksum begin to disagree, memory corruption has occurred. |
| ObjectId | A unique value assigned to this object. This field can be used to identify this object to external systems. |
| RefCounter | Number of other objects pointing to this object. |
| NextItem | Pointer to next temporal variant of this object. (Oldest first.) |
| ShmAddress | Pointer to this object's location in shared memory. |
| KnowledgeBeginDate | Date this object was placed in knowledgebase. |
| KnowledgeEndDate | Date this object was either deleted or replaced by a new variant. |

Figure 3:
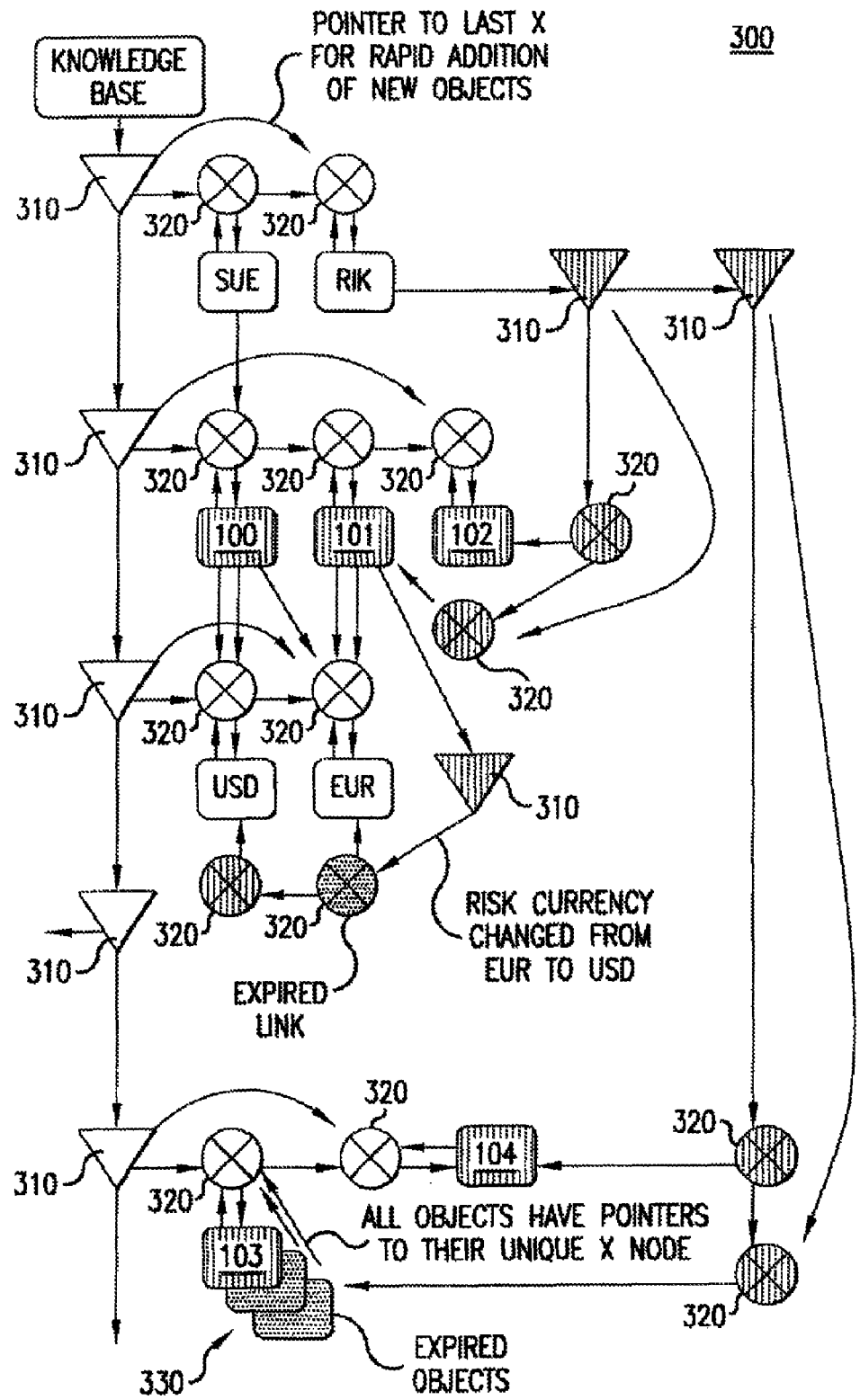

FIG. 3 shows a database structure 300 according to an embodiment of the prior SAGA invention. The structure 300 may represent how various different objects are linked together in the data repository 160 by the application program 130. The structure 300 is not comprehensive and is merely illustrative of an example structure in a portfolio management database.

Y Nodes 310 are shown as triangles, X Nodes 320 as circles with X's in them, and Z nodes 330 are represented by variants stacked vertically, such as Deposit 103. The gray objects are in specific Portfolio repository memory segments, and non-gray objects are in the default segments (described below).

Examples of types of inter- and intra-object pointers are shown in FIG. 3. Since all the objects are linked directly by memory pointers, an application such as the application program 130 can navigate from one data object to another at full memory speed. No "database" operations are required.

A single object may have dozens of linkages to other repository objects. In an embodiment, since these linkages would quickly come to dominate the storage space, objects that are linked "once" to another object, with no variations in the link, point to a special X Node, called a "unique" X Node. There is one "unique" X Node for each object linked to the main knowledgebase object. This may be especially valuable in an example investments setting which has six different pointers to a MediumOfExchange. All of these pointers are generally invariant, and all normally point to the same object. These pointers are PriceDenomination, BifurcationCurrency, RiskCurrency, IncomeCurrency, PrincipalCurrency, and PriceCrossingCurrency.

Figure 4:
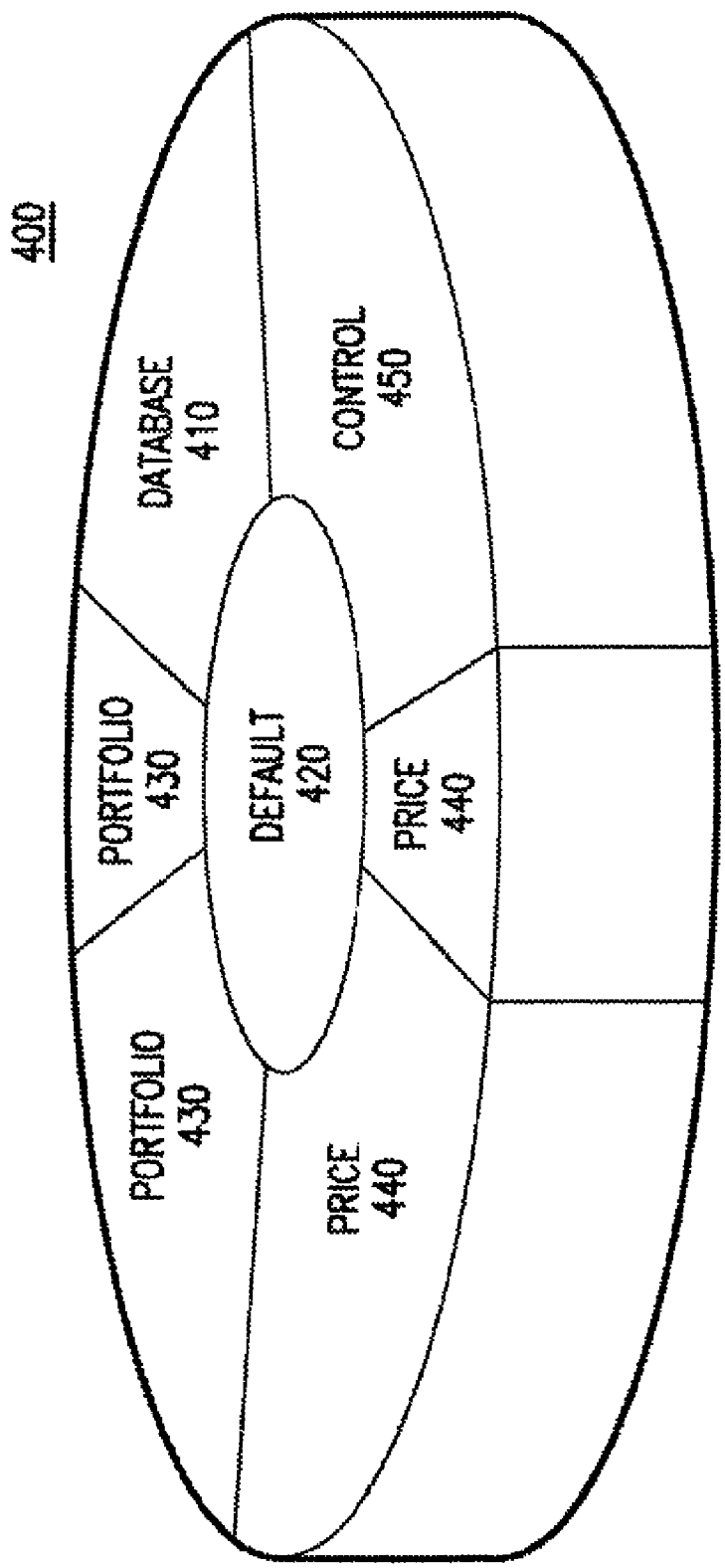

FIG. 4 shows a segmented data repository 400 according to an embodiment of the prior SAGA invention. The data repository 400 is a logical representation, showing example kinds of data segments in a portfolio management application.

In an example embodiment, there are five types of data segments in the data repository 400: database, default (or core), portfolio, price, and control. The database segment 410 holds those objects that define the database. This segment includes the database logfile write buffer, the current database status, and Segment and SegmentFile objects that point to all the other segments in the data repository 400.

The price segments 440 contain all non-MediumOfExchange PriceDay objects as well as links to them. Each price segment 440 represents one month of prices for all investments in the associated portfolio management application. The price segments 440 appear as files to the system, with names containing the year and month in human-readable format.

The portfolio segments 430 hold all the transactions for individual portfolios as well as the links pointing to them, all objects owned by them, and all links pointing to those owned objects. (For example, Reorganization transactions own ReorganizationElements. These ReorganizationElements and the links to their Reorganization parents are all in the same segment as the Reorganization that owns them.) In an embodiment, if the objects are linked to the main knowledgebase object, those links are not placed in the portfolio segments. The Portfolio objects themselves are also not placed in the segments so that they can be searched without paging through the portfolio segments.

The control segment 450 stores all the UserSession and Agent objects that track usage of the knowledgebase. There is only one control segment 450, just as there is only one database segment 410.

The default (or core) segment 420 holds everything that is not placed in any other segment. In an embodiment, the default segment 420 holds about 10-20% of the data.

In an embodiment, a hash table (not shown) resides in the default segment 420. This table allows rapid object access given either primary or secondary keys. Not all object types have entries in this table. Only those that potentially are numerous and might be searched for by key are indexed here. For example, users may look for a particular PortfolioEvent by using a secondary key that they have provided. This table will immediately locate the matching event. The table also may be used to ensure that all primary and secondary keys are unique when a new object is entered into the knowledgebase.

In an embodiment, objects stored in the memory-mapped file segments of the data repository 160 (FIG. 1) or 400 (FIG. 4) are divided into groups, called species. Example species include Prices, PortfolioEvents, control objects (Agents, UserSessions), derived numerical results (such as Time Weighted Return (TWR) values), and core objects (everything else). An individual segment only contains objects of a particular single species. While the species define the segmentation scheme, an individual within a species may be referred to as a specimen. For example, each Portfolio constitutes a specimen of the PortfolioEvent species. Each PriceMonth constitutes a specimen of the Price species.

In a particular embodiment, memory-mapped file segments range from 1 to 16 megabytes in size. Segments may grow automatically from minimum to maximum size as objects are added to them, overflowing into new segments if 16 megabytes is insufficient.

In an embodiment, a user-specified maximum number of segments from each species are held in memory. These segments are evicted from memory on a least-recently-used (LRU) basis. Segments are placed in memory whenever objects that they contain are referenced by the application program 130. The system may run with as little as one segment from any species in memory. As such, a user has essentially total freedom in defining the number of segments that may be concurrently mapped at any one moment.

In an embodiment, to support the splitting of a data repository into segments, object insertion routines test virtual functions that specify how each object type is to be handled during insert. For example, Portfolio-related events may be stored in clusters that are mapped together in memory based on their associated Portfolio.

In an example implementation, when a portfolio is added to the data repository, it is assigned a 16-megabyte address at which to start storing its events. This address is a direct function of the segment identifier that is placed in the Portfolio object. All events associated with this Portfolio will be placed in this allocated memory. Assuming a 44-bit virtual address space, such as provided by SPARC CPUs, more than 1,000,000 Portfolios are supported, each holding about 40,000 events. It is to be understood that reducing the 16-megabyte default size for a segment increases the maximum number of Portfolios that can be supported. In a setting that hosts tens of millions of small, relatively inactive Portfolios, such a reduction may be particularly valuable.

If the 16 megabyte area reserved for the Portfolio is filled, a new, not necessarily contiguous, allocation is created, and filling of the allocated space resumes. In this way, there is no limit to the size of the stored Portfolio. Segment memory is not completely zeroed when it is allocated; thus, no page faults occur in the unused memory.

In an embodiment, a segment address allocation algorithm may involve a highest segment address. The highest segment address may be stored in a database object as a reference. When a new segment is required, it is allocated from this address, and the address is then incremented by 16 megabytes.

When an application process attempts to access memory associated with a Portfolio, memory that is not already mapped will cause a segmentation violation (SIGSEGV). The fault handler then determines if this is a true memory access error or just a request for a segment that is not yet in memory. If the SIGSEGV results from a segment request, the handler memory-maps the segment and restarts the operation.

In an embodiment, although memory space is allocated in 16-megabyte segments, the underlying mapped files may be created and extended in smaller segments, such as 1-megabyte segments. Such a partial allocation approach may greatly lessen the physical disk space needed to store thousands of small Portfolios and reduces backup and file transfer times.

Processes detach the segments that they are no longer using. A maximum memory usage may be enforced where segments are unmapped in a least-recently-used (LRU) manner whenever a user-specified limit is reached. In a portfolio management embodiment, only a few months of prices may need to be mapped into memory at any given time.

In an example implementation, the data repository 160 or 400 holding mapped data segments is stored on a disk subsystem that is connected to a NFS (Network File System) or similar network. Accordingly, the mapped files of the data repository are accessible via NFS from multiple remote computers simultaneously. As such, users who have numerous small computers can team the computers to satisfy large batch processing requirements. Such remote processing is further facilitated by the fact that the network need only transport those data segments that are needed by the remote computers. Such an implementation is scalable, enabling databases to grow extremely large, not limited by hardware memory constraints and associated cost factors.

It is to be appreciated that, because users can leverage existing networks of computers to accelerate batch runs, TCO (Total Cost of Ownership) is lowered, and batch cycle completion times are improved. In addition, troubleshooting of database problems may be performed more rapidly and responsively, as less data needs to be transferred, and tests may be performed using smaller, more readily available computers.

Figure 5:
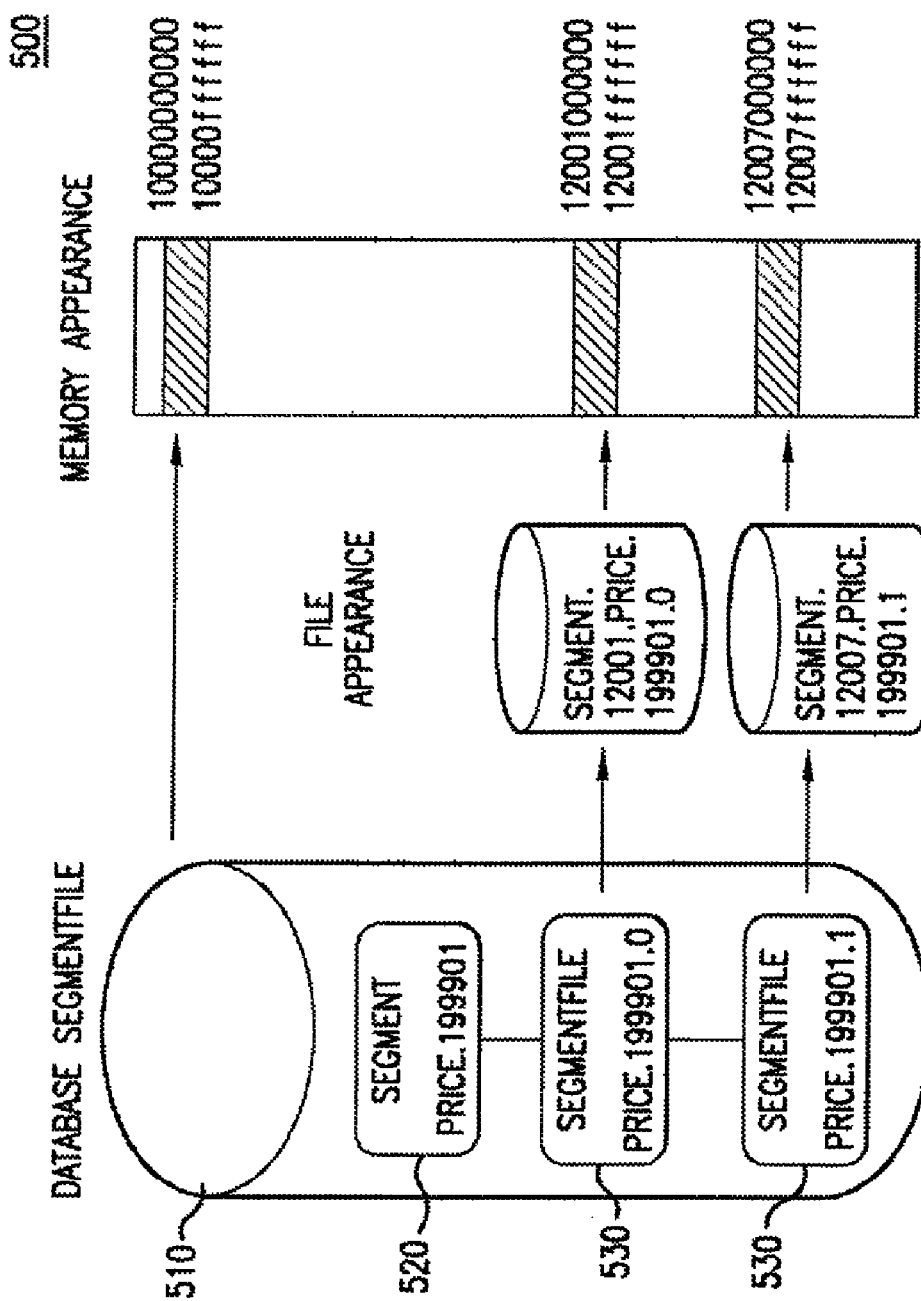

FIG. 5 shows a representation 500 of memory-mapped segment files according to an embodiment of the prior SAGA invention.

In an embodiment, segment files are named such that they can be quickly located and mapped back into main memory when a corresponding object referenced by an application leads to a segmentation fault. In particular, the names of segment files may relate to the address of the corresponding object that leads to the segmentation fault.

In an embodiment, the organization of data into memory-mapped segment files is influenced by a consideration of a logical view of the data, such as interrelationships among data. For instance, related data may be clustered together. Accordingly, the amount of data that needs to be mapped into main memory at any one moment may be greatly reduced. In addition, the application program may run faster because cache hit rates may be improved, and TLB (translation lookaside buffer) misses minimized. Further, segment files can be dropped to purge data from the data repository when necessary or desired.

Since segment files are used to store data, there may be potentially a large number of files stored in segment directories. In an implementation, these files are protected and stored on a device that provides adequate data velocity and capacity. The embodiments herein reduce the amount of swap disk space required to run an application program. This reduction occurs since a multiprocessing operating system must reserve disk swap space equal to the size of the programs kept in process memory. It must reserve this space so that it can move the task out of main memory and onto its swap disk if a higher priority program needs to run. The embodiments herein reduce the amount of swap space that is required, as most of the data is not mapped into memory at any given moment, and that which is mapped into memory is mirrored by the disk files themselves. This means that the operating system does not need to reserve swap disk space for this data, whether it is mapped into memory or not.

In a particular embodiment, a segment, such as a segment for a Portfolio, may be stored in a Segment Library, which has a two-level directory structure. Two ASCII-formatted, hexadecimal digit sequences, representing a portion of the segment's memory address, create file and directory names. The file name also contains the name of the Portfolio for human accessibility. For example, if a report starts processing the PortfolioEvents for Portfolio Fred, and Fred's events have not previously been used, a memory fault might occur at (hexadecimal) address 0x11234567890. The fault handler for the data repository would then attempt to open the segment directory segment.4635.112, looking for a filename matching the pattern segment.4635.11234.*. The file segment.4635.11234.portfolio.fred.0 will match this pattern, and the fault handler will then map this file at address 0x11234000000 for 16-megabytes. If present, this file is attached and the process is restarted.

If a very large Portfolio requires more than one segment, its subsequent segments will have ascending final digits; for example, Fred's Portfolio might have files segment.4635.11234.portfolio.fred.0, segment.4635.112f5.portfolio.fred.1, and segment.4635.1134a.portfolio.fred.2. (Segment addresses start at virtual address 0x10000000000, which is 1 terabyte.) It is to be noted that no central lookup table is necessary because the address provides all information that is needed.

The above naming convention may enable support of multiple data repositories stored in the same directory, as well as access to 15 terabytes out of the 16-terabyte virtual address space. Further, an administrator can easily locate the files belonging to a particular data repository or portion thereof.

In an example implementation, segmentation also may be employed to store prices. Each PriceMonth, in a main database, points to its child PriceDays, which are stored in their matching segments. When a segmentation violation occurs, the segment is loaded into memory, and processing is resumed. Such operations are transparent from the perspective of the application program.

Price segments may have names of the form segment.4635.10008.price.200111.0, where 4635 is the hexadecimal data repository name, 10008 indicates that this page maps at address 0x10008000000, price shows that this is a price segment, 200111 indicates that this is a price segment for November, 2001, and 0 indicates that this is the first segment in what might be a chain of segments for this month.

It is to be appreciated that analogous naming conventions and organizational techniques to those above may be employed in contexts other than portfolio management applications.

FIG. 5 shows example linkages of the stored database objects and the segmentfiles that hold the data that is memory-mapped when referenced. Three segmentfiles are shown. The first is the Database segmentfile 510, which contains the segment 520 and segmentfile 530 objects. The segmentfile 530 objects are normal object segmentfiles. In the example of FIG. 5, they both contain investment price objects for January 1999. The segmentfile names are automatically generated from the keys of the objects being stored and the memory ranges that the data repository routines allocate for them. A segmentfile starts at 1 megabyte in size and can be extended to a maximum of 16 megabytes. If more space is needed, a new segmentfile is created. In various embodiments, a segment may own many non-contiguous segment files.

Figure 6:
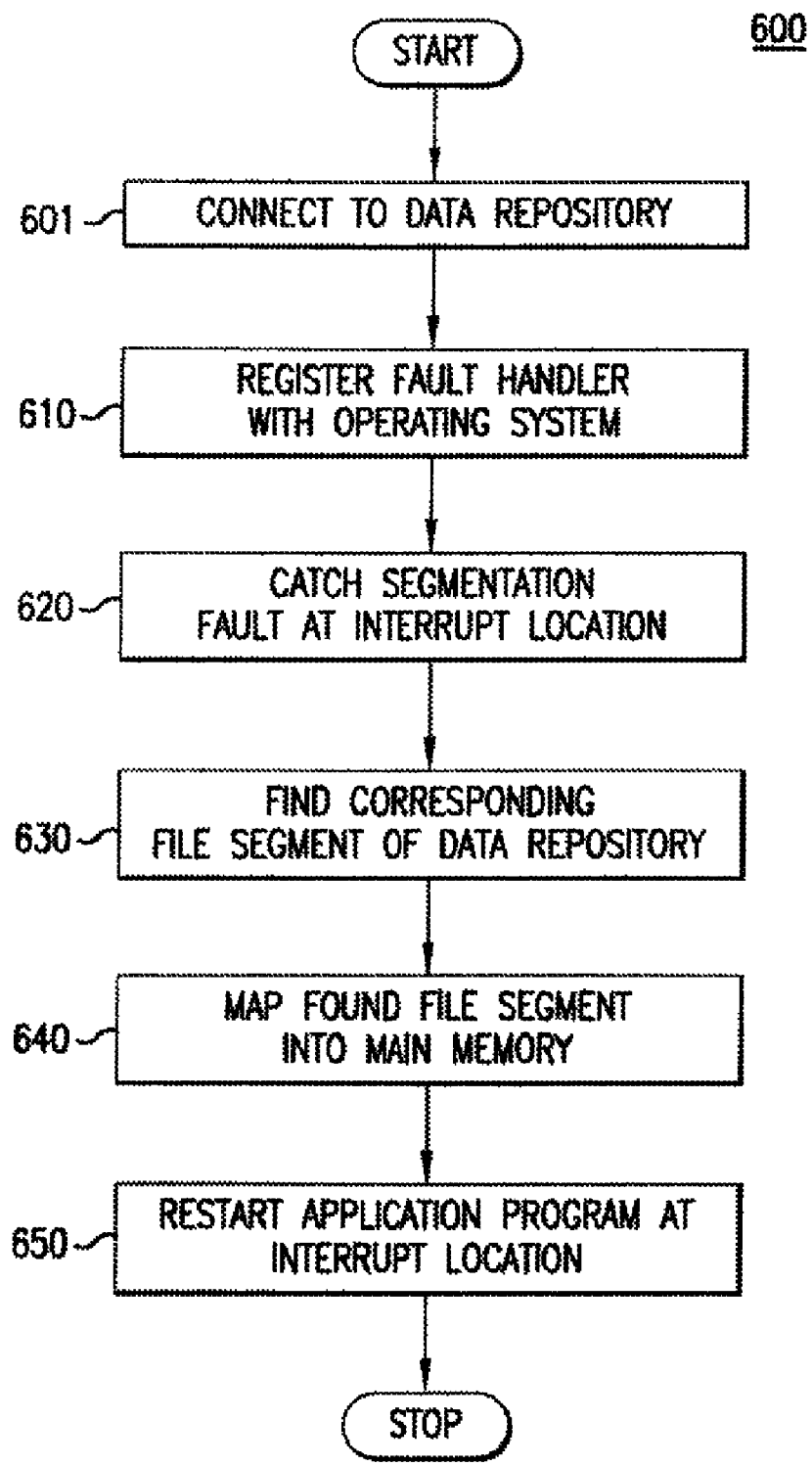

FIG. 6 shows a process 600 according to an embodiment of the prior SAGA invention. The process 600 may be used for memory mapping of databases consistent with the schema 100 of FIG. 1, as well as with other embodiments herein, such as shown in FIGS. 2-5.

In task 601, an application program connects to a data repository of a database. The data repository includes a plurality of memory-mapped file segments stored on at least one nonvolatile memory medium.

In task 610, a fault handler for the data repository is registered with the operating system on which the application program runs. In task 620, the fault handler catches a segmentation fault issued for a data repository object that is referenced by the application program but not currently mapped into main memory. The segmentation fault is issued at an interrupt location in the application program.

In task 630, a file segment of the data repository corresponding to the referenced object is found. In task 640, the found file segment is mapped into main memory. In task 650, the application program is restarted at the interrupt location at which the segmentation fault was issued.

Figure 7A:
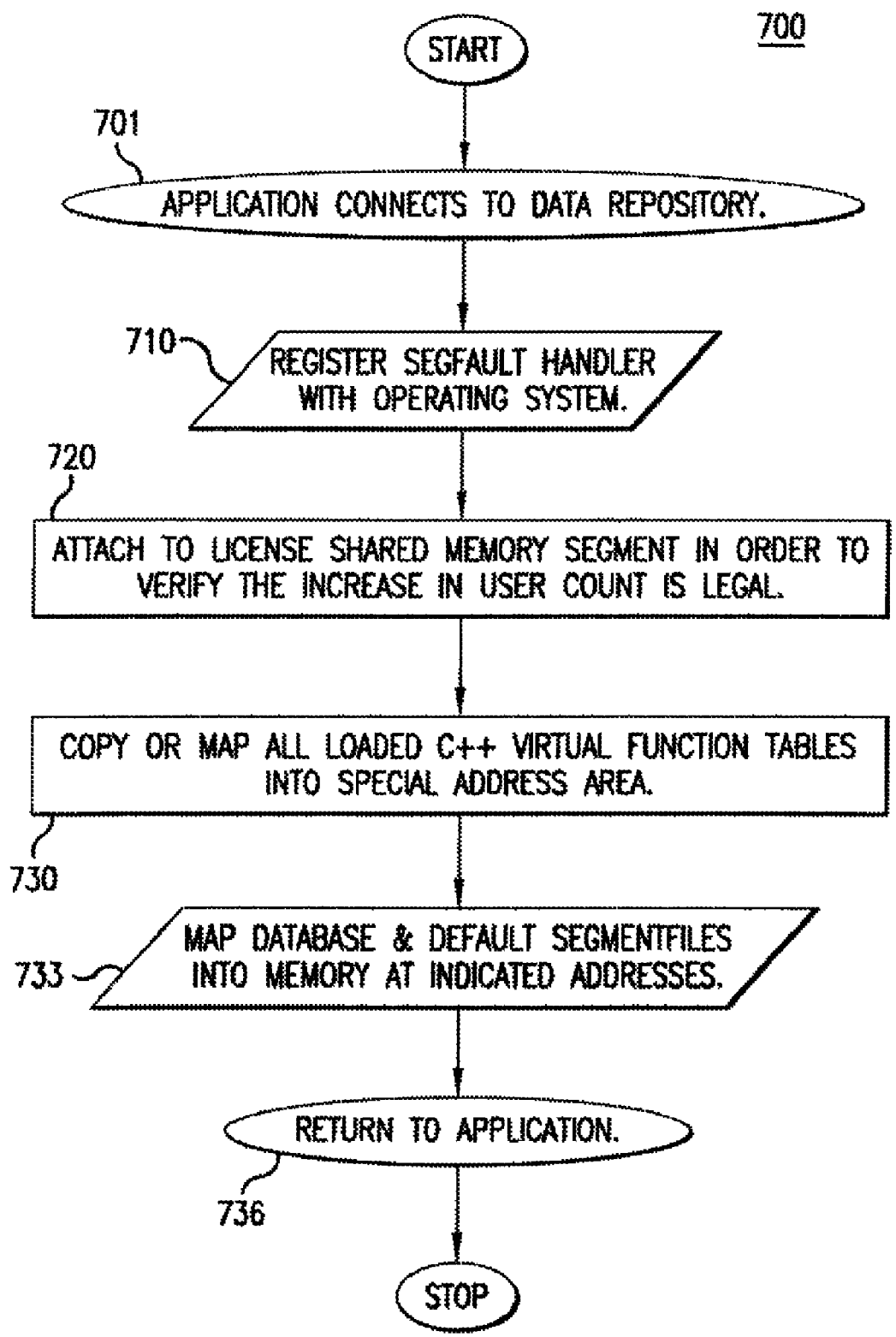
FIG. 7A shows a process according to an embodiment of the prior SAGA invention.
Figure 7B:
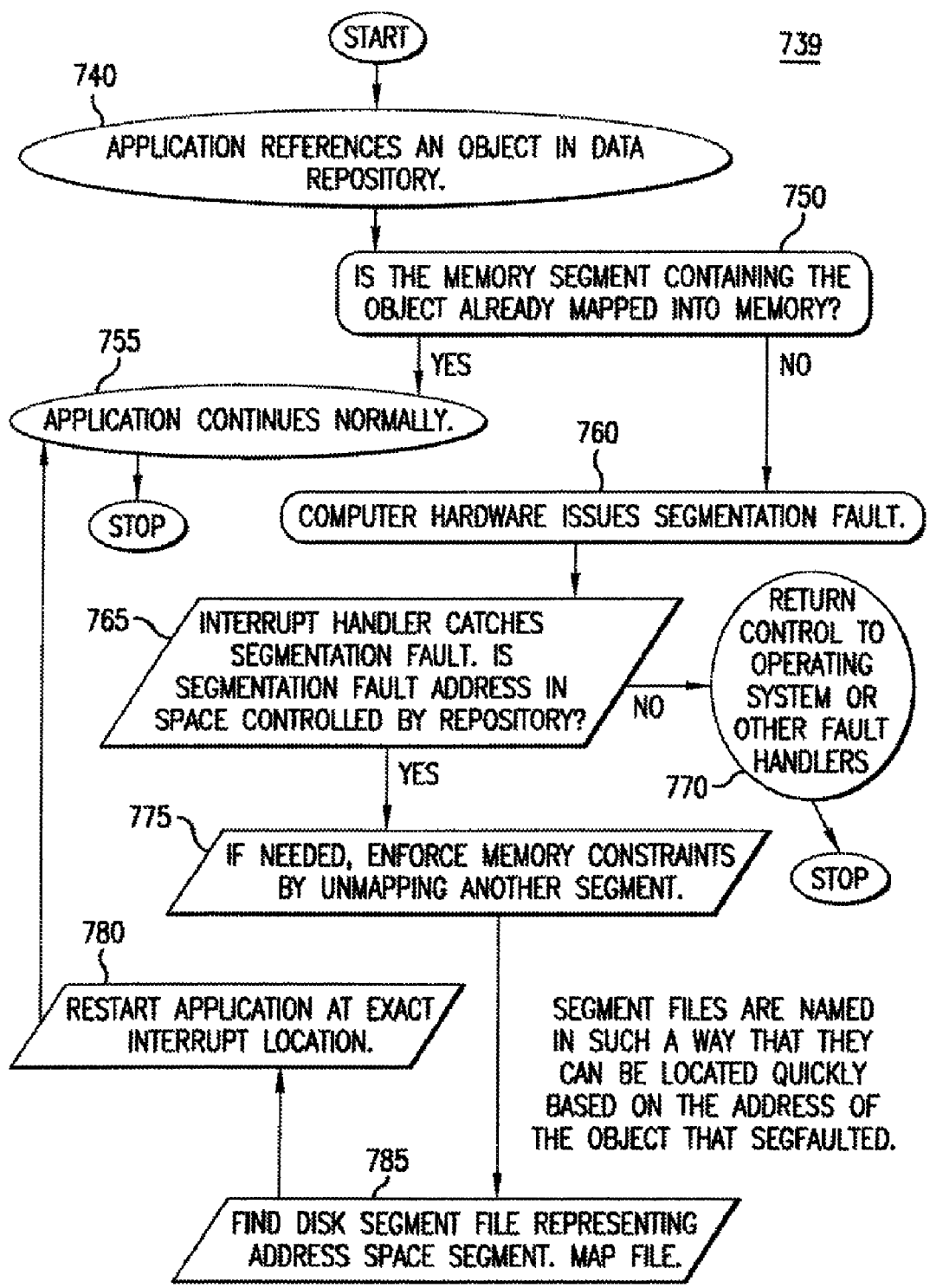
FIG. 7B shows a process according to an embodiment of the prior SAGA invention.

FIGS. 7A and 7B show processes 700, 739 according to embodiments of the prior SAGA inventions. The processes 700, 739 are similar to the process 600 in some respects. The ellipses in the processes 700, 739 show interfaces to outside routines, such as application program(s). Rounded rectangles show computer hardware actions.

In task 701 of FIG. 7A, an application connects to the data repository. In task 710, the repository interrupt handler (SEGFAULT) is registered with the operating system. This interrupt handler is able to catch segmentation faults issued by computer hardware during the course of execution of an application.

In task 720, the application attaches to a license shared memory segment. This task is used to verify that the increase in user count is legal. Task 720 need not be performed in certain embodiments.

In task 730, all loaded C++ virtual functions are copied or mapped into a special address area.

In task 733, database and default segment files are mapped into memory at the addresses indicated by their names. For example, the database segment file that is named segment.10000.database.1.0 is mapped into memory starting at location 0x10000000000. Similarly, the first default segment, segment.10001.default.1.0, would be mapped starting at location 0x10001000000. This mapping is done using the same address mapping methodology depicted in FIG. 5.

In task 736, control is returned to the application.

Turning to task 740 of FIG. 7B, the application references an object in the data repository. The memory segment for that object may or may not be already mapped into main memory. Task 750 determines which is the case. If the segment is already mapped into main memory, then in task 755, the application continues normally.

If the segment is not already mapped, then the computer hardware issues a segmentation fault (task 760).

In task 765, the interrupt handler catches the segmentation fault. It is determined whether the segmentation fault address is in the space controlled by the data repository. If not, then control is returned to the operating system or other fault handlers (task 770).

If the fault address is in that space, then, if needed, memory constraints are enforced by unmapping another segment (task 775). The disk segment file that represents the address space segment is found, and the file is mapped to main memory (task 785). As mentioned above, segment files may be named in such a way that they can be located quickly based on the address of an object that led to a segmentation fault.

In task 780, the application is restarted at the exact interrupt location associated with the segmentation fault.

Figure 8:
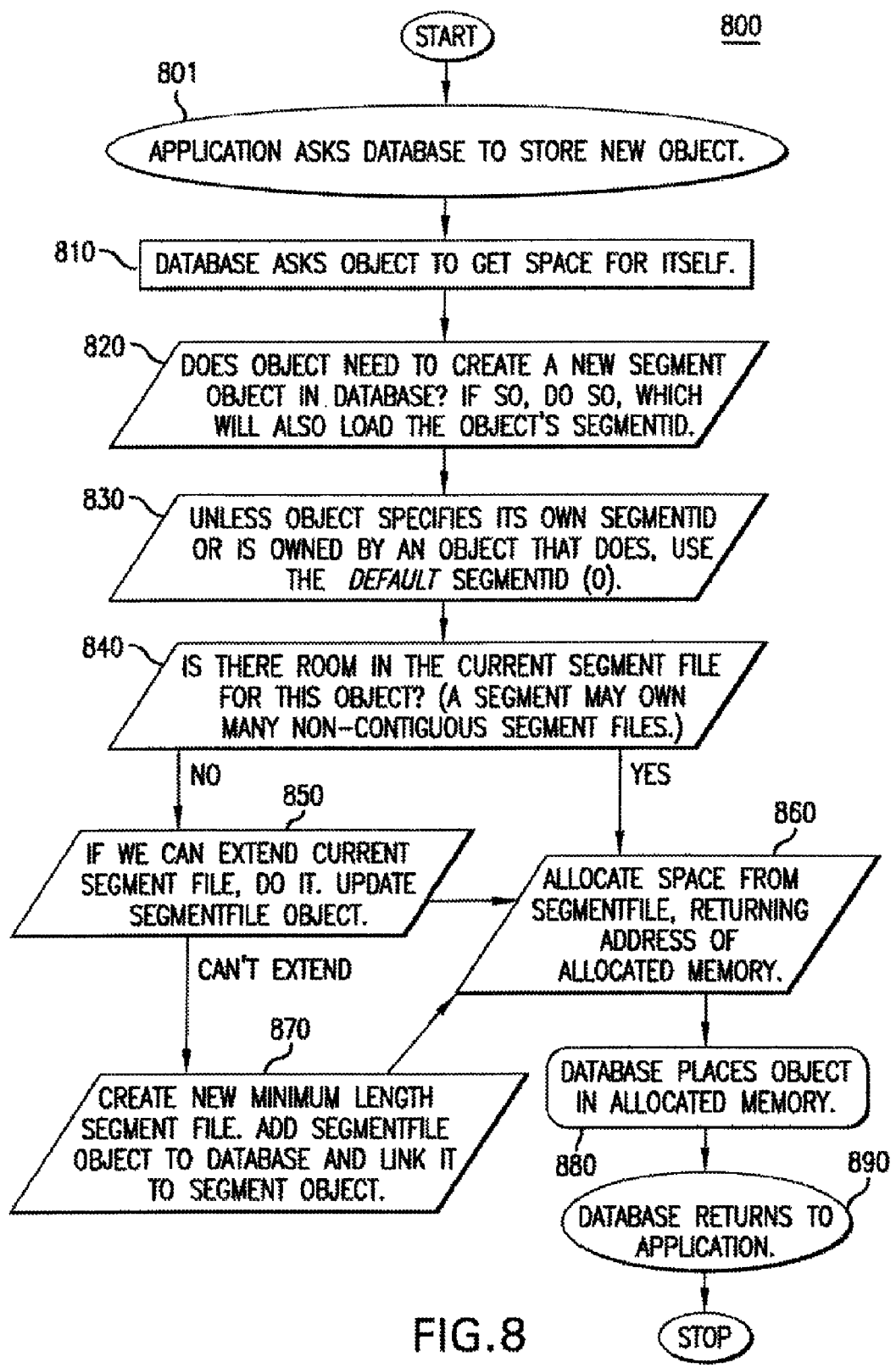

FIG. 8 shows a process 800 according to an embodiment of the prior SAGA invention. The process 800 may be applied when new objects need to be stored in the data repository.

In task 801, an application desiring to add an object to the database calls either an insert or update subroutine as defined by the database API (Application Program Interface). By calling this appropriate subroutine, control is passed to the database routines (task 810), which attempt to perform the corresponding operation and return their success or failure back to the application (task 890).

In task 820, if the object needs to create a new segment object in the database, the segment object is created, which also loads the object's segmentID. A new segment object, with its new corresponding segmentID, is required if the object being stored is the first instance of a new species member. For example, in an embodiment, suppose a new Portfolio, Jean, is added to the database. When the first trade for Portfolio Jean, a Buy for example, must be inserted, there is no place to put this Buy until a segmentfile is created with a corresponding name and a new segment object to point to it.

If the segment object already exists, it will have been retrieved as part of the test performed in task 820 and, as such, the stored object's appropriate segmentID will be known.

Unless the object specifies its own segmentID or is owned by an object that does, the default segmentID(0) is used (task 830). In task 840, the process determines whether there is space for this object in the current segment file. If so, then space is allocated from the segmentfile, and the address of allocated memory is returned (task 860). If not, the current segment file is extended if possible, and the segment file object is updated (task 850). Otherwise, a new minimum length segment file is created, the segment file object is added to the database, and the segment file object is linked to the segment object (task 870).

In task 880, the database places the object in the allocated memory. The database returns to the application in task 890.

Consistent with the above teachings, various example implementations may be realized. In one implementation, support is provided for a 15 terabyte data repository, with up to one million portfolios, using minimal amounts of RAM. Checkpoints lock the entire data repository and perform full file system copies from working to checkpoint directories. There is only one writer for all of the data repository. Multiple-computer support is minimal. Fail-over from one computer to another is not supported.

In another implementation, the file system copy described above is performed in an unlocked mode, which eliminates checkpoint locking issues. Time stamps at the beginning and end of the file copies allow for backstitching of the log file in such a way that changes are reversed that occurred after the start of the checkpoint. Each file has a header object that records the beginning and ending time of the copy.

Another implementation supports failover or automatic switching from one data repository mother computer to another. This feature provides a user uninterrupted operation when maintenance is required on the normal host computer. Msyncing of memory and baton passing occur between two data repository mother computers. Integrity checking is performed in order to recover information that may not have been fully applied because of a crash of an original host computer that necessitates the switching.

In yet another implementation, one writing and multiple reading computers operate simultaneously. An existing computer farm may be employed to expedite processing during batch cycles by dividing the work across the machines in the farm.

Other Matters

The foregoing description of various embodiments of the present invention is provided to enable any person skilled in the art to make and use the present invention and its embodiments. Various modifications to these embodiments are possible, and the generic principles presented herein may be applied to other embodiments as well.

For instance, an existing in-memory database may be converted to a memory-mapped database consistent with embodiments of the present invention. Such a conversion may include the provision of secondary storage for a data repository and the programming of modules, such as a fault handler for the data repository. As is common in the profession, "memory" often refers to volatile solid-state memory, sometimes earlier referred to as random access memory or RAM. Disks are non-volatile storage or secondary storage, and are a type of machine readable memory medium.

It will be apparent to one of ordinary skill in the art that some of the embodiments as described hereinabove may be implemented in many different embodiments of software, firmware, and hardware in the entities illustrated in the figures. The actual software code or specialized control hardware used to implement some of the present embodiments do not limit the present invention.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for receiving, storing and/or processing data for standalone application and/or over a networked medium or media.

Computers and computer systems described herein may include operatively associated computer-readable memory media such as memory for storing software applications and instructions used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD, compact disc, memory stick, ROM (read only memory), RAM (random access memory), PROM (programmable ROM), EEPROM (extended erasable PROM), and/or other like computer-readable media.

In general, computer-readable memory media may include any memory medium capable of being a memory for electronic data representative of data or computer instructions stored, communicated or processed in accordance with embodiments of the present invention. Where applicable, method steps described herein may be embodied or executed as computer instructions stored on a computer-readable memory medium or media.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the present invention, a single component may be replaced by multiple components, and multiple components may be replaced by a single component, to provide an element or structure or to perform a given function or functions. Except where such substitution would not be operative to practice certain embodiments of the present invention, such substitution is considered within the scope of the present invention.

The examples presented herein are intended to illustrate potential and specific implementations of the present invention. It can be appreciated that the examples are intended primarily for purposes of illustration of the invention for those skilled in the art. The diagrams depicted herein are provided by way of example. There may be variations to these diagrams or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the following claims.

What is claimed is:

1. A method for an application program to access an object-oriented database (OODB), the application program being one of a portfolio management application and a trade order management system (TOMS) application, the application program being associated with an operating system, the method comprising:
   (a) connecting to a data repository of the database, the data repository including a plurality of memory-mapped file segments stored on at least one nonvolatile memory medium, wherein the database is not stored in a main memory of a computer connecting to the data repository, the file segments including objects directly interconnected by memory pointers, wherein each object has an associated stored time stamp, the time stamp indicating at least one of a time when the object first appeared in the data repository and a time when the object became invalid, wherein the data in the data repository is not copied into main memory from the data repository when needed by the application program, and wherein the database is one of a portfolio management database and a TOMS database;
   (b) registering a fault handler with the operating system, the fault handler associated with the data repository;
   (c) catching, by the fault handler, a segmentation fault issued for an object referenced by the application program and resident in the data repository, the segmentation fault issued at an interrupt location in the application program;
   (d) finding a file segment of the data repository that corresponds to the referenced object;
   (e) mapping the found file segment into the main memory;
   (f) restarting the application program at the interrupt location; and
   (g) using a plurality of writing processes to simultaneously update a plurality of objects in the data repository, wherein each writing process writes to one object at a time, and wherein the objects in the data repository are divided into a plurality of genera, and wherein each genera has its own transaction log and lock object.

2. The method of claim 1, wherein the file segments include at least one portfolio segment and price segment.

3. A method for an application program to manage memory associated with an object-oriented database (OODB) accessed by the application program, the application program associated with an operating system, the method comprising:

(a) connecting to a data repository of the database, the data repository including a plurality of memory-mapped file segments stored on at least one nonvolatile memory medium, wherein the database is not stored in a main memory of a computer connecting to the data repository;
(b) registering a fault handler with the operating system, the fault handler associated with the data repository;
(c) catching, by the fault handler, a segmentation fault issued for an object referenced by the application program and resident in the data repository, the segmentation fault issued at an interrupt location in the application program;
(d) finding a file segment of the data repository that corresponds to the referenced object;
(e) mapping the found file segment into the main memory;
(f) restarting the application program at the interrupt location; and
(g) using a plurality of writing processes to simultaneously update a plurality of objects in the data repository, wherein each writing process writes to one object at a time, and wherein the objects in the data repository are divided into a plurality of genera, and wherein each genera has its own transaction log and lock object, and wherein file segments in the data repository are not copied into the main memory from the data repository when needed by the application program and are instead read, updated, deleted or modified directly in the data repository by the application program.

4. The method of claim 3, further comprising unmapping a second file segment from the main memory before mapping the found file segment.

5. The method of claim 4, wherein file segments are unmapped according to a least-recently-used (LRU) criterion.

6. The method of claim 3, wherein the nonvolatile memory medium is a disk.

7. The method of claim 3, wherein objects in the data repository are directly interconnected by memory pointers.

8. The method of claim 7, wherein the objects comprise C++ objects.

9. The method of claim 7, wherein a linkage in the interconnected objects includes at least one of an X node, a Y node, and a Z node.

10. The method of claim 3, wherein each object includes a virtual function pointer, the pointer pointing to a shared memory area holding virtual function tables associated with object types.

11. The method of claim 3, wherein every object in a class of the data repository points to a same predetermined shared memory address when stored.

12. The method of claim 3, wherein each object includes a pointer to itself.

13. The method of claim 3, wherein each object in the data repository has an associated stored time stamp, the time stamp indicating at least one of a time when the object first appeared in the data repository and a time when the object became invalid.

14. The method of claim 13, wherein the time stamp is stored in a header of the object.

15. The method of claim 3, wherein the application program is a portfolio management application, and the database is a portfolio management database.

16. The method of claim 15, wherein the file segments include at least one portfolio segment and price segment.

17. The method of claim 3, further comprising:
(a) upon a request by the application program to store a new object in the database, creating a segment object in the data repository;
(b) associating a segment identifier with the new object, the segment identifier being one of a default segment identifier, a segment identifier specified by the new object, and a segment identifier specified by another object that owns the new object;
(c) if a current segment file has sufficient memory for the new object, allocating memory to the new object from the current segment file;
(d) if the current segment file has insufficient space for the new object, allocating memory to the new object by extending the current segment file or creating a new segment file; and
(e) storing the new object in the allocated memory.

18. The method of claim 17, wherein memory is allocated in 16 megabyte segments.

19. The method of claim 17, wherein segment files are extended or created in 1 megabyte segments.

20. The method of claim 3, wherein the data repository is connected to a NFS (Network File System) network.

21. The method of claim 20, wherein multiple computers access the data repository via the NFS network.

22. The method of claim 3, wherein the data repository resides in multiple computers.

23. The method of claim 3, wherein the found file segment is stored in a segment library having a two-level directory structure.

24. The method of claim 23, wherein a file name of the found file segment includes a hexadecimal digit sequence representative of a portion of a memory address of the found file segment.

25. The method of claim 23, wherein a directory name of a directory containing the found file segment includes a hexadecimal digit sequence representative of a portion of a memory address of the found file segment.

26. The method of claim 3, wherein the application program and database are associated with a trade order management system (TOMS).

27. A computer system for an application program to manage memory associated with an object-oriented database (OODB) accessed by the application program, the application program associated with an operating system, the computer system for an application program to manage memory comprising:
an application and database server, the server including a secondary storage, the secondary storage including a data repository;
(b) means for connecting to the data repository of the database, the data repository including a plurality of memory-mapped file segments stored on at least one nonvolatile memory medium, wherein the database is not stored in a main memory of a computer connecting to the data repository;
(c) means for registering a fault handler with the operating system, the fault handler associated with the data repository;
(d) means for catching, by the fault handler, a segmentation fault issued for an object referenced by the application program and resident in the data repository, the segmentation fault issued at an interrupt location in the application program;
(e) means for finding a file segment of the data repository that corresponds to the referenced object;

(f) means for mapping the found file segment into the main memory;
(g) means for restarting the application program at the interrupt location; and
(h) means for using a plurality of writing processes to simultaneously update a plurality of objects in the data repository, wherein each writing process writes to one object at a time, and wherein the objects in the data repository are divided into a plurality of genera, and wherein each genera has its own transaction log and lock object, and wherein file segments in the data repository are not copied into the main memory from the data repository when needed by the application program and are instead read, updated, deleted or modified directly in the data repository by the application program.

28. The computer system of claim 27, wherein the application program is a portfolio management application, and the database is a portfolio management database.

29. An object-oriented database (OODB), comprising:
(a) a data repository including a plurality of memory-mapped file segments stored on at least one nonvolatile memory medium;
(b) the file segments including objects directly interconnected by memory pointers;
(c) each object having an associated stored time stamp, the time stamp indicating at least one of a time when the object first appeared in the data repository and a time when the object became invalid; and
(d) the data in the data repository not being copied into a main memory of a computer accessing the data,
wherein the database is not stored in the main memory,
wherein the data repository has an associated fault handler, the fault handler registered by an application program with an operating system associated with the application program,
wherein the fault handler is configured to catch a segmentation fault issued for an object referenced by the application program and resident in the data repository, the segmentation fault issued at an interrupt location in the application program,
wherein a file segment of the data repository that corresponds to the referenced object is mapped into the main memory,
wherein the application program is restarted at the interrupt location,
wherein a plurality of writing processes simultaneously update a plurality of objects in the data repository, and each writing process writes to one object, and
wherein the objects in the data repository are divided into a plurality of genera, and wherein each genera has its own transaction log and lock object.

30. The database of claim 29, wherein the application program is a portfolio management application, and the data repository is a portfolio management data repository.

* * * * *